US012613620B2

(12) United States Patent
Chen et al.

(10) Patent No.: US 12,613,620 B2
(45) Date of Patent: Apr. 28, 2026

(54) TRANSLATION METHOD AND ELECTRONIC DEVICE

(71) Applicant: Honor Device Co., Ltd., Shenzhen (CN)

(72) Inventors: Jiazi Chen, Shenzhen (CN); Yiyan Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 73 days.

(21) Appl. No.: 18/547,239

(22) PCT Filed: May 5, 2022

(86) PCT No.: PCT/CN2022/091046
§ 371 (c)(1),
(2) Date: Aug. 21, 2023

(87) PCT Pub. No.: WO2023/024566
PCT Pub. Date: Mar. 2, 2023

(65) Prior Publication Data
US 2024/0134504 A1 Apr. 25, 2024

(30) Foreign Application Priority Data
Aug. 27, 2021 (CN) .......................... 202110996636.6

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/0488* (2013.01); *G06F 40/58* (2020.01)

(58) Field of Classification Search
None
See application file for complete search history.

(56) References Cited

U.S. PATENT DOCUMENTS

| 2011/0145753 A1* | 6/2011 | Prakash | .............. G06F 3/04812 |
| | | | 715/783 |
| 2012/0084634 A1* | 4/2012 | Wong | .................... G06F 40/169 |
| | | | 715/233 |

(Continued)

FOREIGN PATENT DOCUMENTS

| CN | 102402372 A | 4/2012 |
| CN | 104615592 A | 5/2015 |

(Continued)

*Primary Examiner* — William L Bashore
*Assistant Examiner* — Koorosh Nehchiri
(74) *Attorney, Agent, or Firm* — Slater Matsil, LLP

(57) ABSTRACT

A translation method and an electronic device, wherein the method comprises: displaying a first interface, and the first interface includes a text in a first language; displaying a first control in the first interface in response to a first operation performed on a first text in the first interface; the first control is used to trigger the electronic device to perform translation; displaying a first pop-up window in the first interface in response to a second operation performed on the first control, and displaying a first translation result in the first pop-up window; retracting the first pop-up window in response to a third operation performed on the first interface; expanding the first pop-up window in response to a fourth operation performed on a second text in the first interface, and displaying a second translation result in the first pop-up window.

20 Claims, 32 Drawing Sheets

(51) Int. Cl.
  G06F 3/0488    (2022.01)
  G06F 40/58    (2020.01)

(56)        References Cited

U.S. PATENT DOCUMENTS

| | | | |
|---|---|---|---|
| 2013/0047115 A1* | 2/2013 | Migos ................... | G06F 3/0484 |
| | | | 715/776 |
| 2013/0110494 A1* | 5/2013 | Elgazzar ................. | G06F 40/40 |
| | | | 704/3 |
| 2013/0345980 A1* | 12/2013 | van Os ............... | G09G 3/3413 |
| | | | 701/538 |
| 2015/0128037 A1 | 5/2015 | Lee et al. | |
| 2015/0331855 A1* | 11/2015 | Rylov ..................... | G06F 40/58 |
| | | | 704/2 |
| 2021/0165953 A1* | 6/2021 | Li ........................... | G06F 40/58 |

FOREIGN PATENT DOCUMENTS

| | | |
|---|---|---|
| CN | 106802795 A | 6/2017 |
| CN | 107153541 A | 9/2017 |
| CN | 109977425 A | 7/2019 |
| CN | 111680521 A | 9/2020 |
| CN | 112905093 A | 6/2021 |
| EP | 3822829 A1 | 5/2021 |

* cited by examiner

Figure 1:
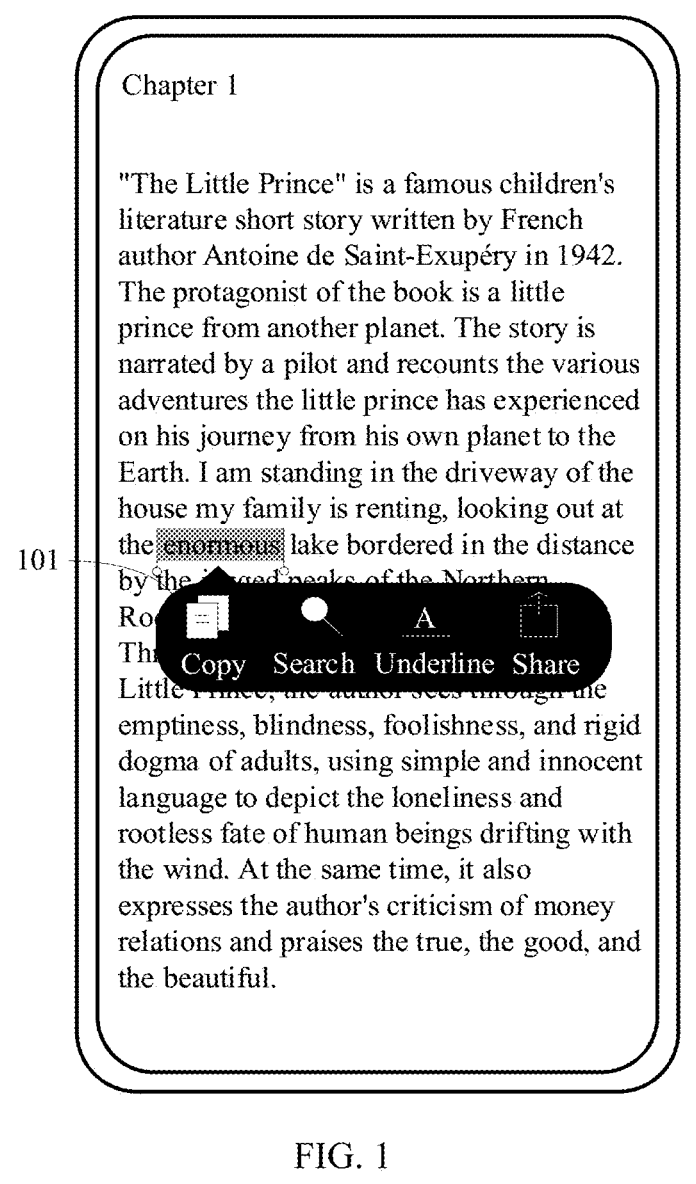

Chapter 1

"The Little Prince" is a famous children's literature short story written by French author Antoine de Saint-Exupéry in 1942. The protagonist of the book is a little prince from another planet. The story is narrated by a pilot and recounts the various adventures the little prince has experienced on his journey from his own planet to the Earth. I am standing in the driveway of the house my family is renting, looking out at the enormous lake bordered in the distance by the snowed peaks of the Northern Ro Th
Little Prince, the author sees through the emptiness, blindness, foolishness, and rigid dogma of adults, using simple and innocent language to depict the loneliness and rootless fate of human beings drifting with the wind. At the same time, it also expresses the author's criticism of money relations and praises the true, the good, and the beautiful.

Copy    Search    Underline    Share

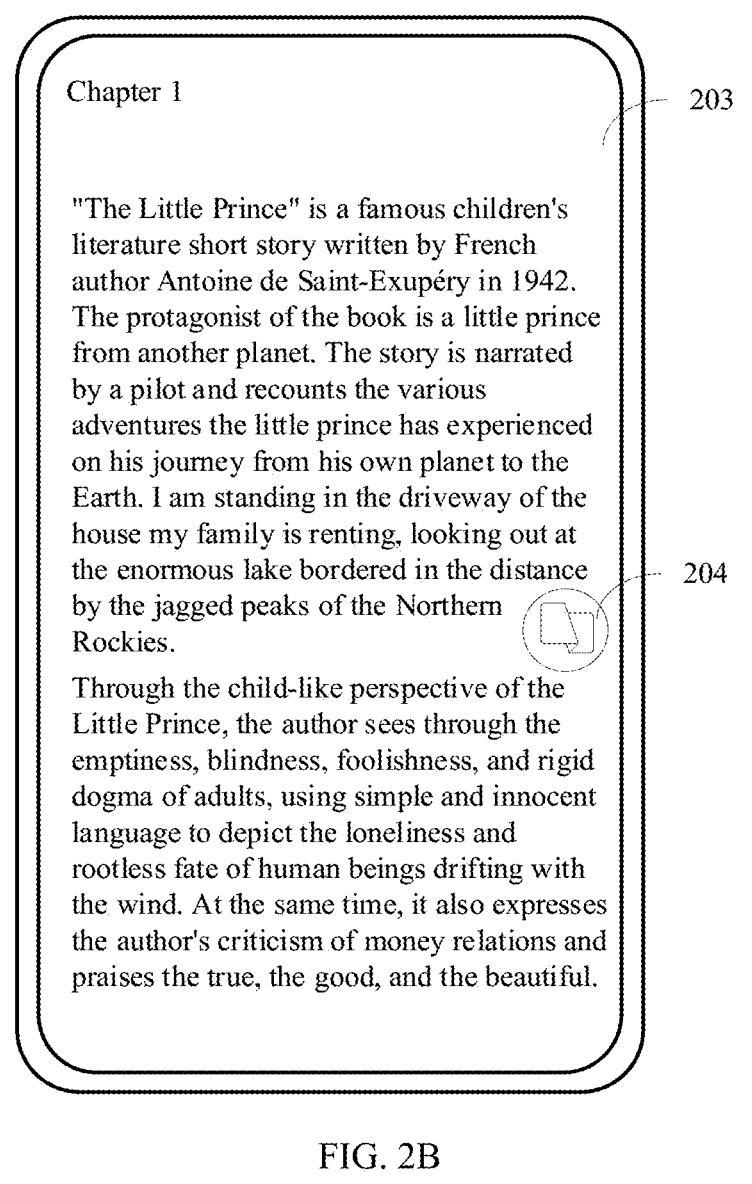

Chapter 1

— 203

"The Little Prince" is a famous children's literature short story written by French author Antoine de Saint-Exupéry in 1942. The protagonist of the book is a little prince from another planet. The story is narrated by a pilot and recounts the various adventures the little prince has experienced on his journey from his own planet to the Earth. I am standing in the driveway of the house my family is renting, looking out at the enormous lake bordered in the distance by the jagged peaks of the Northern Rockies.

— 204

Through the child-like perspective of the Little Prince, the author sees through the emptiness, blindness, foolishness, and rigid dogma of adults, using simple and innocent language to depict the loneliness and rootless fate of human beings drifting with the wind. At the same time, it also expresses the author's criticism of money relations and praises the true, the good, and the beautiful.

FIG. 2B

Figure 2C:
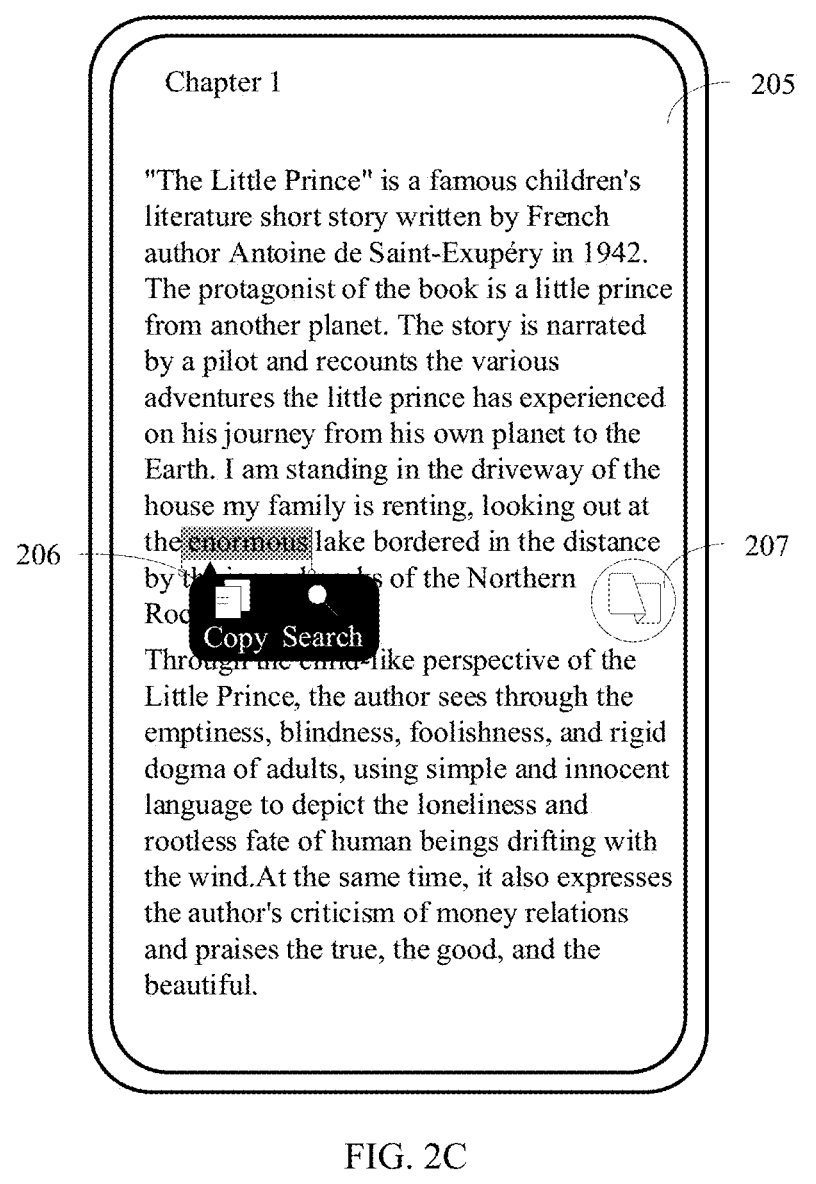

Chapter 1      — 205

"The Little Prince" is a famous children's
literature short story written by French
author Antoine de Saint-Exupéry in 1942.
The protagonist of the book is a little prince
from another planet. The story is narrated
by a pilot and recounts the various
adventures the little prince has experienced
on his journey from his own planet to the
Earth. I am standing in the driveway of the
house my family is renting, looking out at
the enormous lake bordered in the distance      — 207
by the pine woods of the Northern
Rock.

Copy   Search

Through the child-like perspective of the
Little Prince, the author sees through the
emptiness, blindness, foolishness, and rigid
dogma of adults, using simple and innocent
language to depict the loneliness and
rootless fate of human beings drifting with
the wind.At the same time, it also expresses
the author's criticism of money relations
and praises the true, the good, and the
beautiful.

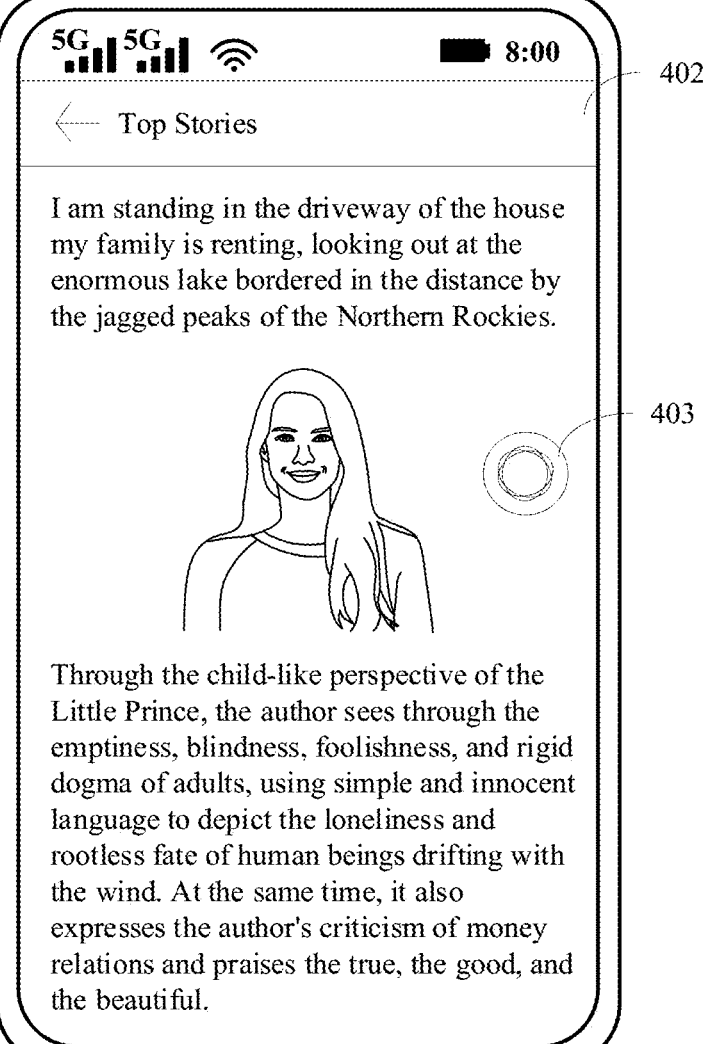

I am standing in the driveway of the house my family is renting, looking out at the enormous lake bordered in the distance by the jagged peaks of the Northern Rockies.

Through the child-like perspective of the Little Prince, the author sees through the emptiness, blindness, foolishness, and rigid dogma of adults, using simple and innocent language to depict the loneliness and rootless fate of human beings drifting with the wind. At the same time, it also expresses the author's criticism of money relations and praises the true, the good, and the beautiful.

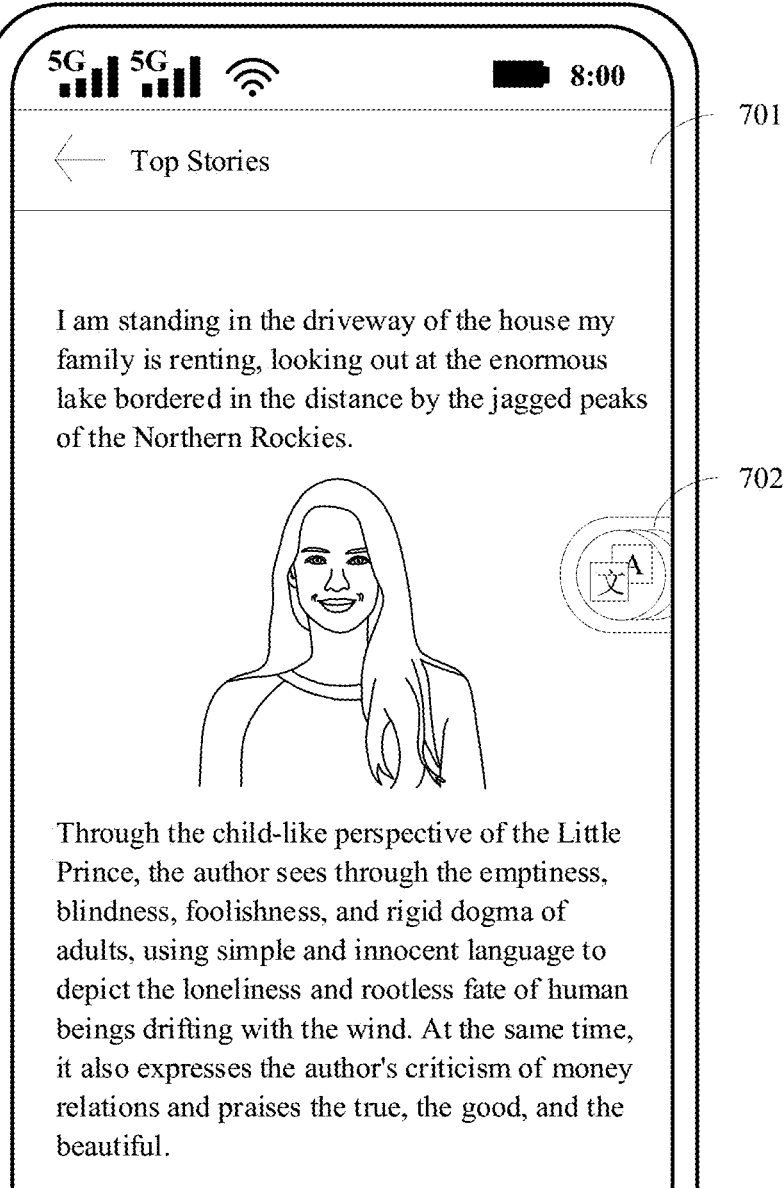

701

Top Stories

I am standing in the driveway of the house my family is renting, looking out at the enormous lake bordered in the distance by the jagged peaks of the Northern Rockies.

702

Through the child-like perspective of the Little Prince, the author sees through the emptiness, blindness, foolishness, and rigid dogma of adults, using simple and innocent language to depict the loneliness and rootless fate of human beings drifting with the wind. At the same time, it also expresses the author's criticism of money relations and praises the true, the good, and the beautiful.

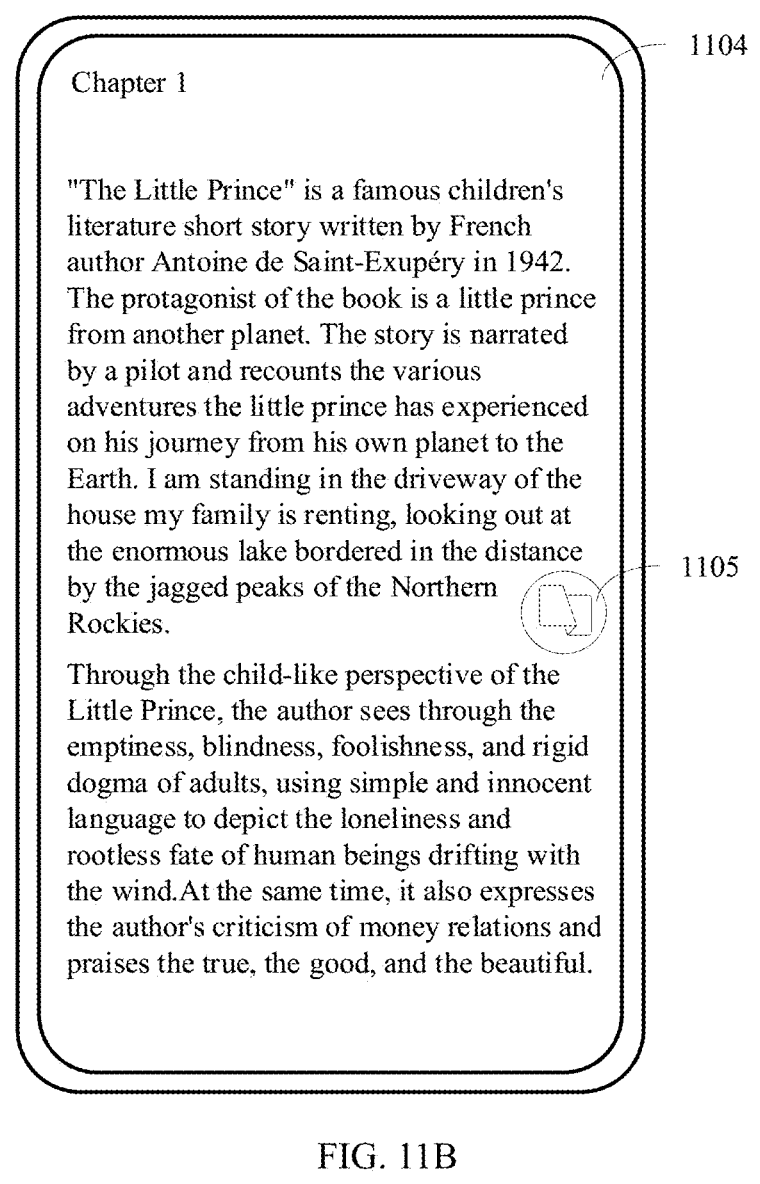

Chapter 1

"The Little Prince" is a famous children's
literature short story written by French
author Antoine de Saint-Exupéry in 1942.
The protagonist of the book is a little prince
from another planet. The story is narrated
by a pilot and recounts the various
adventures the little prince has experienced
on his journey from his own planet to the
Earth. I am standing in the driveway of the
house my family is renting, looking out at
the enormous lake bordered in the distance
by the jagged peaks of the Northern
Rockies.

1105

Through the child-like perspective of the
Little Prince, the author sees through the
emptiness, blindness, foolishness, and rigid
dogma of adults, using simple and innocent
language to depict the loneliness and
rootless fate of human beings drifting with
the wind.At the same time, it also expresses
the author's criticism of money relations and
praises the true, the good, and the beautiful.

FIG. 11B

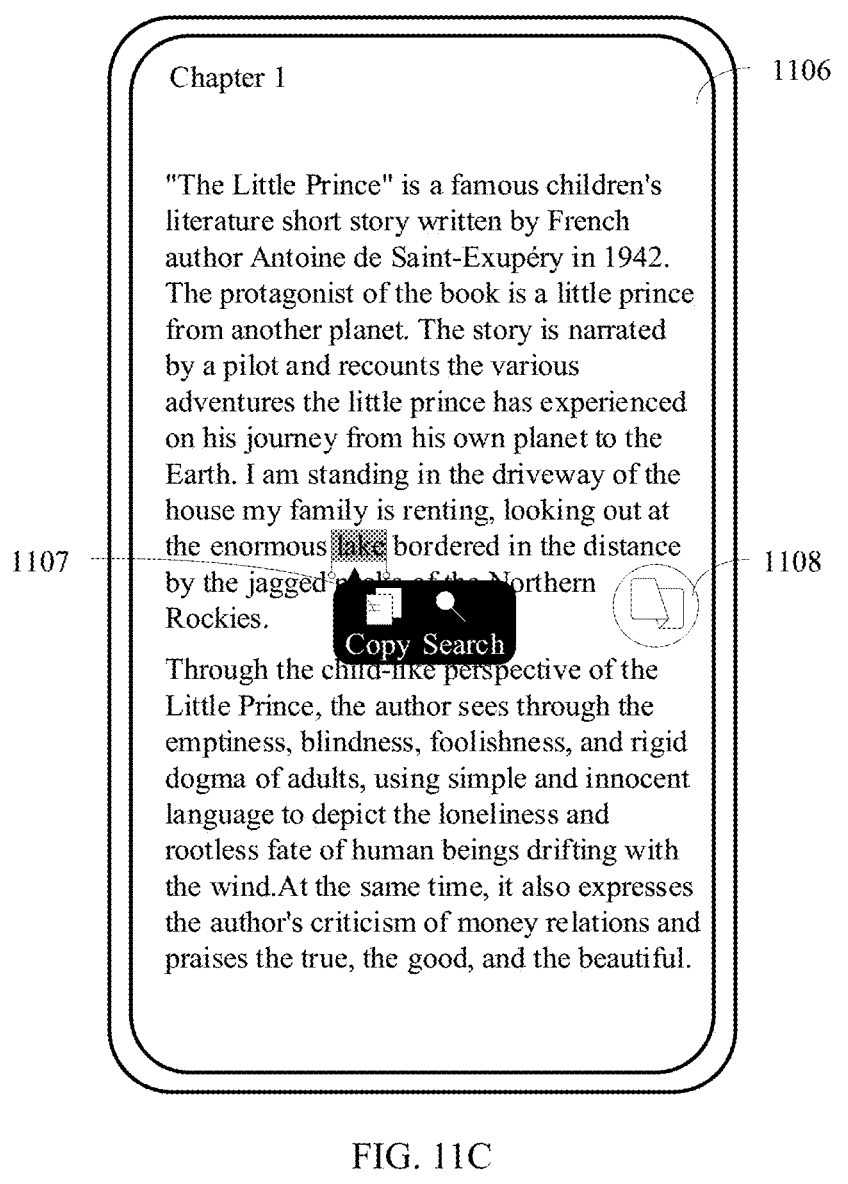

Chapter 1                                             1106

"The Little Prince" is a famous children's
literature short story written by French
author Antoine de Saint-Exupéry in 1942.
The protagonist of the book is a little prince
from another planet. The story is narrated
by a pilot and recounts the various
adventures the little prince has experienced
on his journey from his own planet to the
Earth. I am standing in the driveway of the
house my family is renting, looking out at
1107 — the enormous ▓▓ bordered in the distance                   — 1108
by the jagged ▓▓ of the Northern
Rockies.

Copy   Search

Through the child-like perspective of the
Little Prince, the author sees through the
emptiness, blindness, foolishness, and rigid
dogma of adults, using simple and innocent
language to depict the loneliness and
rootless fate of human beings drifting with
the wind.At the same time, it also expresses
the author's criticism of money relations and
praises the true, the good, and the beautiful.

FIG. 11C

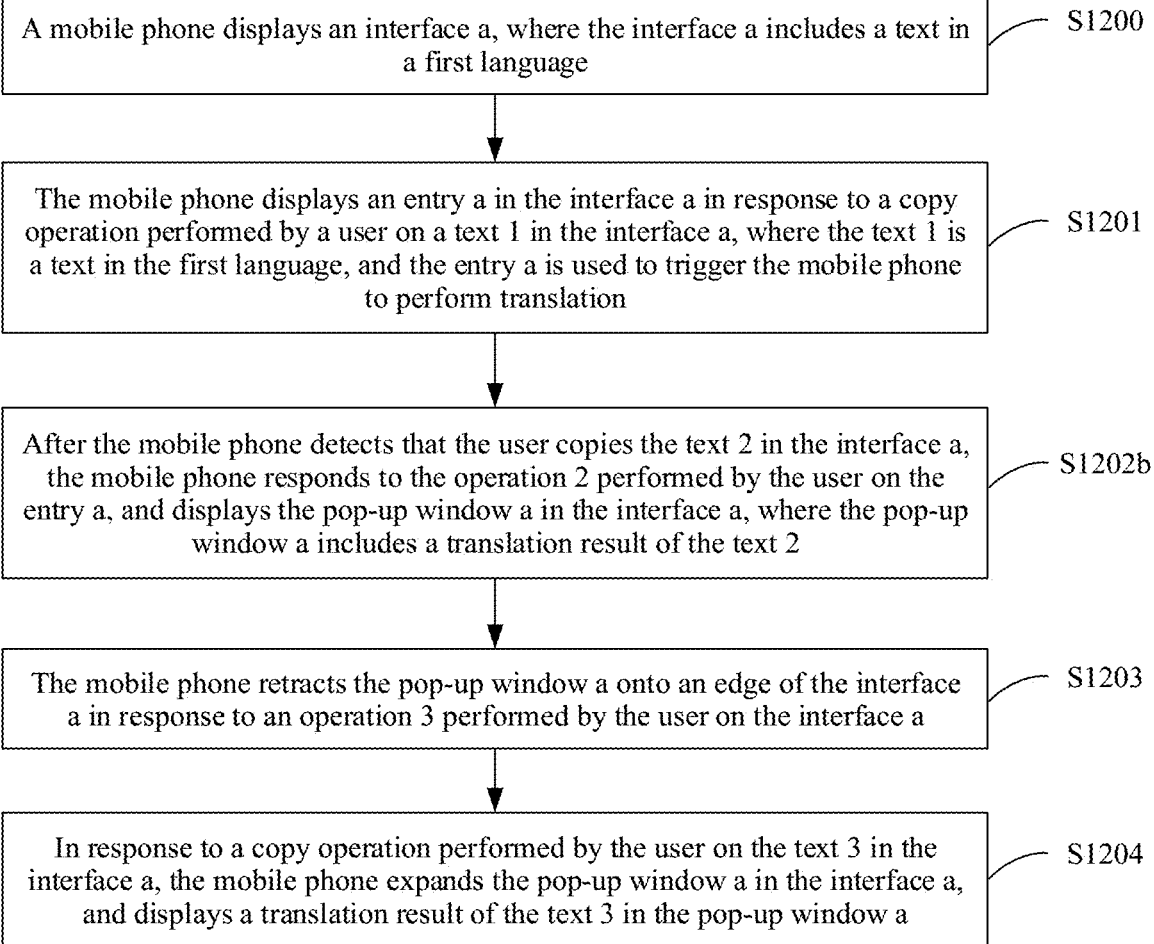

A mobile phone displays an interface a, where the interface a includes a text in a first language — S1200

The mobile phone displays an entry a in the interface a in response to a copy operation performed by a user on a text 1 in the interface a, where the text 1 is a text in the first language, and the entry a is used to trigger the mobile phone to perform translation — S1201

After the mobile phone detects that the user copies the text 2 in the interface a, the mobile phone responds to the operation 2 performed by the user on the entry a, and displays the pop-up window a in the interface a, where the pop-up window a includes a translation result of the text 2 — S1202b The mobile phone retracts the pop-up window a onto an edge of the interface a in response to an operation 3 performed by the user on the interface a — S1203

In response to a copy operation performed by the user on the text 3 in the interface a, the mobile phone expands the pop-up window a in the interface a, and displays a translation result of the text 3 in the pop-up window a — S1204

FIG. 14

TRANSLATION METHOD AND ELECTRONIC DEVICE

CROSS-REFERENCE TO RELATED APPLICATIONS

This application is a national stage of International Application No. PCT/CN2022/091046, filed on May 5, 2022, which claims priority to Chinese Patent Application No. 202110996636.6, filed on Aug. 27, 2021. The disclosures of both of the aforementioned applications are hereby incorporated by reference in their entireties.

TECHNICAL FIELD

This application relates to the field of terminal technologies, and in particular, to a translation method and an electronic device.

BACKGROUND

In a process in which a user uses an electronic device such as a mobile phone, a requirement for performing a corresponding operation on a selected text may exist, for example, a translation requirement for the selected text and a sharing requirement for the selected text. To meet the foregoing requirements of the user, the electronic device generally provides the following function: After detecting the user's operation of selecting a text, the mobile phone may display quick entries for one or more functions to the user, so that the user can quickly select and use the function. For example, the one or more functions may be a copy function and a search function.

However, in a process of implementing embodiments of this application, the inventor finds that at least the following problem exists in the conventional technology: The foregoing one or more functions usually are only some fixed functions, and are most likely to fail to meet a user requirement.

SUMMARY

Embodiments of this application provide a translation method and an electronic device, so as to intelligently display a quick entry for a translation function, and implement fast continuous translation.

According to a first aspect, an embodiment of this application provides a translation method, which may be applied to an electronic device that can implement a translation function, such as a mobile phone or a tablet. The electronic device may display a first interface, and the first interface includes a text in a first language. For example, the first language is English. The electronic device may receive a first operation (such as a select operation) of a user on a first text in the first interface. The first text is a text in the first language. In response to the first operation performed by the user on the first text in the first interface, the electronic device may trigger identification of an intention of the user to input the first operation. If an intention of performing translation is identified, a first control may be displayed in the first interface. The first control is used to trigger the electronic device to perform translation. That is, the electronic device may intelligently identify the intention of the user, and display a quick entry (such as the first control) in the first interface, so as to quickly implement the intention. After the first control is displayed, the electronic device may receive a second operation (for example, a tap operation)

performed by the user on the first control. The electronic device may display a first pop-up window in the first interface in response to the second operation performed by the user on the first control, and display a first translation result of the first text in the first pop-up window. The first translation result includes a first translation of the first text, and the first translation is a text in a second language. In this way, one time of translation is completed.

Then, if there is a continuous translation requirement, the electronic device may receive a third operation performed by the user on the first interface (for example, a tap operation on a region other than the first pop-up window). The electronic device retracts the first pop-up window in response to a third operation performed by the user on the first interface. That is, if there is a continuous translation requirement, the electronic device may not close the first pop-up window, but merely retract the first pop-up window. Then, the electronic device may receive a fourth operation (such as a copy operation) performed by the user on a second text in the first interface. The electronic device may expand the first pop-up window in response to the fourth operation performed by the user on the second text in the first interface, and display a second translation result of the second text in the first pop-up window. The second translation result includes a second translation of the second text. In this way, after the electronic device retracts the first pop-up window, in response only to a fourth operation performed by the user on a new text, the electronic device may trigger the electronic device to directly display a translation result of the new text.

In conclusion, by using the method in this embodiment of this application, the electronic device may trigger, by using the first operation input by the user, display of the first control for performing translation, thereby providing a quick entry for the user to obtain a translation result. After one time of translation ends, the electronic device may not close the first pop-up window, but retracts the first pop-up window, and after the user inputs an operation such as selecting or copying a new text, the electronic device may automatically expand the first pop-up window and display a translation result of the new text. Compared with a manner in the conventional technology in which a pop-up window is closed after each time of translation is completed, and display of a new translation result can be triggered only after a quick entry is tapped after a new text is copied, in this application, after an operation such as selecting or copying a new text is input by the user, the first pop-up window is automatically expanded and a new text translation result is displayed, thereby simplifying a continuous translation operation and improving continuous translation efficiency.

In another possible design manner of the first aspect, the second language is a default language set on the electronic device, and the first language is a language other than the second language. Generally, the default language set on the electronic device is a language familiar to the user. For example, if Chinese is the mother tongue of the user, the user may set the default language of the electronic device to Chinese. It should be understood that the default language set on the electronic device is a language familiar to the user, and usually does not need to be translated. On the contrary, the first language is most likely not a language familiar to the user, and therefore needs to be translated. That is, translation requirements corresponding to different languages are different.

In one case, the electronic device may display the first control in response to the first operation performed by the user on the text in the first language (such as the first text)

in the first interface, so that the user quickly obtains a translation result of the text in the first language. In addition, in the translation result displayed in this case, a default translation is a translation in the second language, so as to facilitate understanding by the user. In another case, the first interface further includes a text in the second language. In response to the first operation performed by the user on the text in the second language (such as a third text) in the first interface, the electronic device identifies that a translation requirement does not exist, so that the first control is not displayed. In short, for first operations performed by the user on texts in different languages, the electronic device may identify whether there is an intention to perform translation, so as to determine whether to display the first control.

That is, by using the method in this embodiment, the electronic device may specially display the first control, so as to accurately meet an intention of the user to perform translation.

In another possible design manner of the first aspect, the first language is a language supported for translation by a system of the electronic device or by an application on the electronic device. If the electronic device does not support translation of the first language, the first control displayed is unavailable. That is, the user cannot obtain a translation result by inputting a second operation on the first control.

That is, by using the method in this embodiment, the electronic device may display the first control for a language supported for translation by the electronic device. Therefore, availability of the first control is improved.

In another possible design manner of the first aspect, the first text is not a website link, an email address, or a password generated by using a machine. Generally speaking, the website link, the email address, and the password generated by using a machine (such as a Taobao promo code) are just identifiers that are used to distinguish between different objects, for example, used to distinguish between different web pages, different email addresses, and different Taobao commodities, but do not have language meanings. As a result, there is generally no translation requirement for such text.

That is, by using the method in this embodiment, the electronic device may display the first control for a common text.

In another possible design manner of the first aspect, the first operation includes any one of a select operation, a copy operation, a long press operation, an underline operation, and a double tap operation; and/or the fourth operation includes any one of a select operation, a copy operation, a long press operation, an underline operation, and a double tap operation.

That is, by using the method in this embodiment, the electronic device may flexibly display the first control in response to various operations performed by the user on the text. Therefore, difficulty of fast translation can be reduced. In addition, the electronic device may expand the first pop-up window flexibly in response to various operations performed by the user on the text. Therefore, difficulty of continuous translation can be reduced.

In another possible design manner of the first aspect, the third operation includes a tap operation or a long press operation performed by the user on a region other than the first pop-up window in the first interface, or the third operation includes a slide operation performed by the user on the first pop-up window.

That is, by using the method in this embodiment, the electronic device may retract a pop-up window in response to an operation performed by the user on a non-pop-up window region or a slide operation performed on a pop-up window region. This facilitates continuous translation.

In another possible design manner of the first aspect, the retracting the first pop-up window includes: hiding the first pop-up window, or retracting the first pop-up window onto an edge position of the first interface.

That is, by using the method in this embodiment, the electronic device may retract a pop-up window to an interface edge or hide the pop-up window instead of closing the pop-up window. This facilitates subsequent expansion.

In another possible design manner of the first aspect, the electronic device displays at least one second control in the first interface in response to the first operation performed by the user on the first text in the first interface, where the at least one second control is used to trigger the electronic device to add a memo; and/or the at least one second control is used to trigger the electronic device to add a schedule; and/or the at least one second control is used to trigger the electronic device to share with an application; and/or the at least one second control is used to trigger the electronic device to add to favorites; and/or the at least one second control is used to trigger the electronic device to add to a dictionary; and/or the at least one second control is used to trigger the electronic device to open map navigation.

That is, by using the method in this embodiment, the electronic device may not only identify an intention of performing translation and display a quick entry for implementing translation, but also identify another intention and display a corresponding quick entry. Therefore, various requirements of the user can be met.

In another possible design manner of the first aspect, the first control includes a first text or a first translation.

That is, by using the method in this embodiment, the electronic device may directly display, at a quick entry, a text targeted by the first operation or a translation of the text. Displaying the text targeted by the first operation may facilitate the user to determine the targeted text. Displaying the translation can directly provide a translation result to the user, further improving efficiency of man-machine interaction.

In another possible design manner of the first aspect, the electronic device displays a first identifier in the first interface in response to the first operation performed by the user on the first text in the first interface. The first identifier is used to indicate that the electronic device is identifying an intention of the user to input the first operation. That is, in a process of identifying the intention of the user, the electronic device may display a state in which the electronic device is in identification. Therefore, an explicit indication may be provided to the user. Then, the electronic device displays the first control in the first interface in response to an identification completion event of the intention.

That is, by using the method in this embodiment, the electronic device may provide the user with an indication in identification, so that the user determines a current status of the electronic device.

In another possible design manner of the first aspect, generally, to facilitate user operation, the electronic device may completely present a quick entry for implementing the intention in the interface. If there are a plurality of intentions, a plurality of quick entries corresponding to the plurality of intentions are tiled in the interface. For example, the mobile phone may display an interface 404 shown in FIG. 4C. The interface 404 includes a floating window 405, and the floating window 405 displays quick entries for three intentions: performing translation, adding a memo, and sharing with a chat APP. In addition, the three quick entries are tiled. However, when the quick entries are complete and tiled in the interface, this may block interface content. Based on this, after the first control is displayed in the first interface, the method further includes: When the electronic device does not detect the second operation within a preset time, the electronic device retracts the first control onto the edge position of the first interface.

That is, by using the method in this embodiment, the electronic device may retract the first control when the user does not operate the first control for a long time. It should be understood that if the user does not operate the first control for a long time, it may indicate that no translation requirement is generated. In this case, retracting the first control can reduce blocking of the interface content, and does not hinder the user's requirement.

In addition, after the first control is retracted, the electronic device may expand the first control again in response to a preset operation (such as a tap operation or a slide operation) of the user.

In another possible design manner of the first aspect, after the first pop-up window is displayed in the first interface, the method further includes: The electronic device closes the first control in response to a fifth operation of the user. The fifth operation is used to trigger the electronic device to exit the first interface or to exit a first application to which the first interface belongs.

That is, by using the method in this embodiment, compared with a manner of displaying a quick entry for a long time after a corresponding service (for example, a copy to translate service) is enabled in the conventional technology, in the solution of this application, a quick entry for implementing an intention can be automatically closed after the intention of the user disappears, and use of the mobile phone by the user may be prevented from being affected. The user is not required to manually disable the corresponding service to trigger closing of the quick entry. Therefore, intelligent display and disabling of the first control are improved.

In another possible design manner of the first aspect, the second operation is a tap operation or a long press operation.

That is, by using the method in this embodiment, the electronic device may display the translation result to the user in response to a tap operation or a long press operation performed by the user on the first control.

According to a second aspect, an embodiment of this application further provides an electronic device, where the electronic device supports a translation function. For example, a system of the electronic device or an application installed on the electronic device may be used for translation. The electronic device includes a display, a memory, and one or more processors. The display and the memory are coupled to the processor. The memory is configured to store computer program code, where the computer program code includes computer instructions, and when the computer instructions are executed by the processor, the electronic device performs the following steps: The electronic device displays a first interface, where the first interface includes a text in a first language; the electronic device displays a first control in the first interface in response to a first operation performed by a user on a first text in the first interface, where the first text is a text in the first language, and the first control is used to trigger the electronic device to perform translation; the electronic device displays a first pop-up window in the first interface in response to a second operation performed by the user on the first control, and displays a first translation result of the first text in the first pop-up window, where the first translation result includes a first translation of the first text, and the first translation is a text in a second language; the electronic device retracts the first pop-up window in response to a third operation performed by the user on the first interface; and the electronic device expands the first pop-up window in response to a fourth operation performed by the user on a second text in the first interface, and displays a second translation result of the second text in the first pop-up window, where the second translation result includes a second translation of the second text.

In another possible design manner of the second aspect, the second language is a default language set on the electronic device, and the first language is a language other than the second language; and the first interface further includes a text in the second language. When the computer instructions are executed by the processor, the electronic device further performs the following step: The electronic device skips displaying the first control in response to a first operation performed by the user on a third text in the first interface, where the third text is a text in the second language.

In another possible design manner of the second aspect, the first language is a language supported for translation by a system of the electronic device or by an application on the electronic device.

In another possible design manner of the second aspect, the first text is not a website link, an email address, or a password generated by using a machine.

In another possible design manner of the second aspect, the first operation includes any one of a select operation, a copy operation, a long press operation, an underline operation, or a double tap operation; and/or the fourth operation includes any one of a select operation, a copy operation, a long press operation, an underline operation, and a double tap operation.

In another possible design manner of the second aspect, the third operation includes a tap operation or a long press operation performed by the user on a region other than the first pop-up window in the first interface, or the third operation includes a slide operation performed by the user on the first pop-up window.

In another possible design manner of the second aspect, the first pop-up window is hidden, or the first pop-up window is retracted onto an edge position of the first interface.

In another possible design manner of the second aspect, when the computer instructions are executed by the processor, the electronic device further performs the following steps: The electronic device displays at least one second control in the first interface in response to the first operation performed by the user on the first text in the first interface, where the at least one second control is used to trigger the electronic device to add a memo; and/or the at least one second control is used to trigger the electronic device to add a schedule; and/or the at least one second control is used to trigger the electronic device to share with an application; and/or the at least one second control is used to trigger the electronic device to add to favorites; and/or the at least one second control is used to trigger the electronic device to add to a dictionary; and/or the at least one second control is used to trigger the electronic device to open map navigation.

In another possible design manner of the second aspect, the first control includes the first text or a translation of the first text.

In another possible design manner of the second aspect, the electronic device displays a first identifier in the first interface in response to the first operation performed by the user on the first text in the first interface, where the first identifier is used to indicate that the electronic device is identifying an intention of the user to input the first operation; and when the computer instructions are executed by the processor, the electronic device further performs the following step: The electronic device displays the first control in the first interface in response to an identification completion event of the intention.

In another possible design manner of the second aspect, when the computer instructions are executed by the processor, the electronic device further performs the following step: When the electronic device does not detect the second operation within a preset time, the electronic device retracts the first control onto the edge position of the first interface.

In another possible design manner of the second aspect, when the computer instructions are executed by the processor, the electronic device further performs the following step: The electronic device closes the first control in response to a fifth operation of the user, where the fifth operation is used to trigger the electronic device to exit the first interface or to exit a first application to which the first interface belongs.

In another possible design manner of the second aspect, the second operation is a tap operation or a long press operation.

According to a third aspect, an embodiment of this application provides a chip system. The chip system is applied to an electronic device including a display and a memory; the chip system includes one or more interface circuits and one or more processors; the interface circuit and the processor are interconnected by using a wire; the interface circuit is configured to receive a signal from the memory of the electronic device and send the signal to the processor, where the signal includes computer instructions stored in the memory; and when the processor executes the computer instructions, the electronic device performs the method according to the first aspect and any possible design manner of the first aspect.

According to a fourth aspect, this application provides a computer storage medium. The computer storage medium includes computer instructions. When the computer instructions are run on an electronic device, the electronic device is enabled to perform the method described in any one of the first aspect and the possible designs of the first aspect.

According to a fifth aspect, this application provides a computer program product. When the computer program product is run on a computer, the computer is enabled to perform the method according to the first aspect and any possible design manner of the first aspect.

It can be understood that for beneficial effects that can be achieved by the electronic device according to the second aspect, the chip system according to the third aspect, the computer storage medium according to the fourth aspect, and the computer program product according to the fifth aspect, refer to the beneficial effects in the first aspect and any possible design manner of the first aspect. Details are not described herein again.

BRIEF DESCRIPTION OF THE DRAWINGS

FIG. 1 is a schematic diagram 1 of a mobile phone interface according to an embodiment of this application;

FIG. 2A to FIG. 2C are a schematic diagram 2 of a mobile phone interface according to an embodiment of this application;

FIG. 4A to FIG. 4C are a schematic diagram 3 of a mobile phone interface according to an embodiment of this application;

FIG. 7 is a schematic diagram 5 of a mobile phone interface according to an embodiment of this application;

FIG. 11A to FIG. 11D are a schematic diagram 9 of a mobile phone interface according to an embodiment of this application;

FIG. 14 is a flowchart 2 of a translation method according to an embodiment of this application;

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In description of the embodiments, unless otherwise described, "a plurality of" means two or more than two.

To facilitate understanding of the solutions of this application, the following uses an example in which an electronic device is a mobile phone to describe the conventional technology and a technical problem in the conventional technology.

In the conventional technology, some applications (Application, APP) block a specific function, for example, block a translation function. Correspondingly, in these applications, quick entries for one or more functions displayed to the user after the mobile phone detects an operation of selecting a text by a user generally do not include a quick entry for the specific function. Therefore, the user cannot meet a requirement for using the specific function, which reduces efficiency of human-computer interaction.

For example, as shown in FIG. 1, in an APP (such as a read APP), after the user selects text content "enormous", the mobile phone may display a shortcut menu 101, where the shortcut menu 101 includes quick entries for four functions: a copy function, a search function, an underline function, and a share function. Apparently, the shortcut menu 101 does not include a translation function. That is, the translation function is blocked by the APP. If the user has a translation requirement, translation can only be completed by first copying the text content "enormous" and then pasting it into a translation application or a translation web page. In the foregoing translation process, the user needs to jump back and forth between two applications, and operations are cumbersome and inefficient.

Figure 2A:
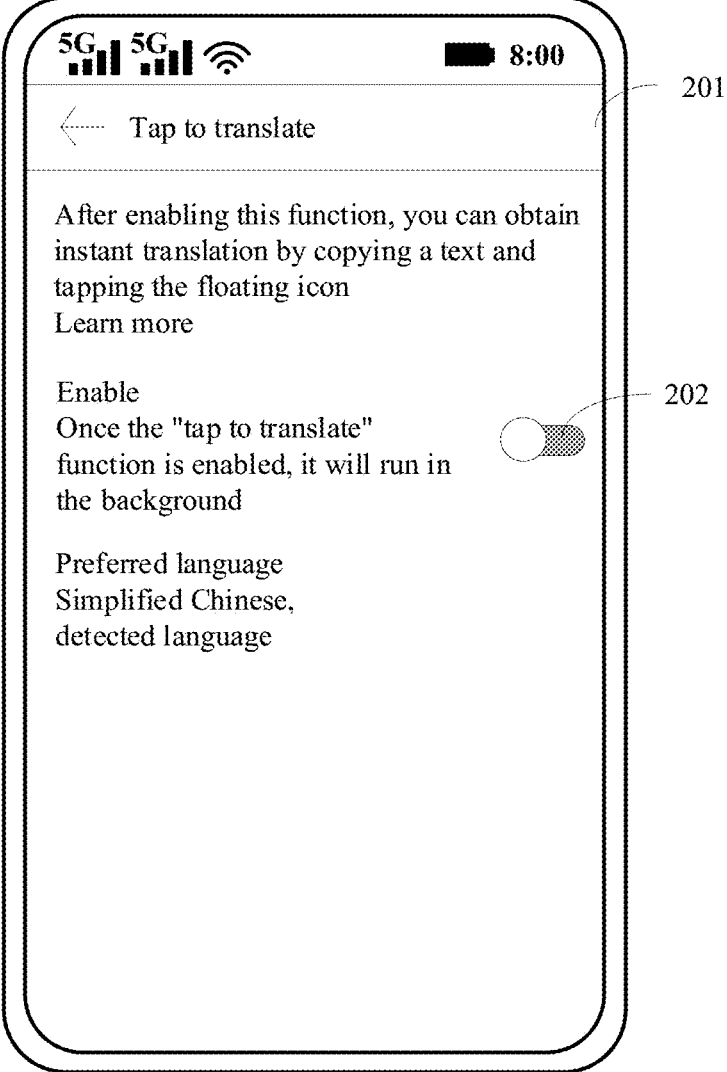

To solve a problem caused by blocking a specific function by the foregoing application, the conventional technology further provides an improved solution for the translation function, which is specifically as follows: The mobile phone first enables a copy to translate service. For example, in application settings of a translation APP installed on the mobile phone, a "tap to translate" setting item in an interface 201 shown in FIG. 2A is provided. The interface 201 includes a button 202 for enabling "tap to translate". A user taps the button 202 to enable the copy to translate service. After the mobile phone enables the copy to translate service, the mobile phone can display a quick entry for implementing the translation function on any currently displayed interface. For example, after the mobile phone enables the copy to translate service, if the mobile phone enters a read interface of a read APP, the mobile phone may display an interface 203 shown in FIG. 2B. The interface 203 includes a floating window 204, where the floating window 204 is used to trigger the mobile phone to translate a copied text, that is, the floating window 204 is a quick entry for implementing the translation function. Then, after copying the text, the user taps the floating window to obtain a translation result of the copied text. For example, after the user selects the text "enormous" in the read interface, the mobile phone may display an interface 205 shown in FIG. 2C. The interface 205 includes a shortcut menu 206 and a floating window 207. In response to the user's tap operation on the "copy" button in the shortcut menu 205, the mobile phone can copy "enormous" to a clipboard. Then, in response to the tap operation performed by the user on the floating window 207, the mobile phone obtains a translation result of the text "enormous" in the clipboard.

Figure 3:
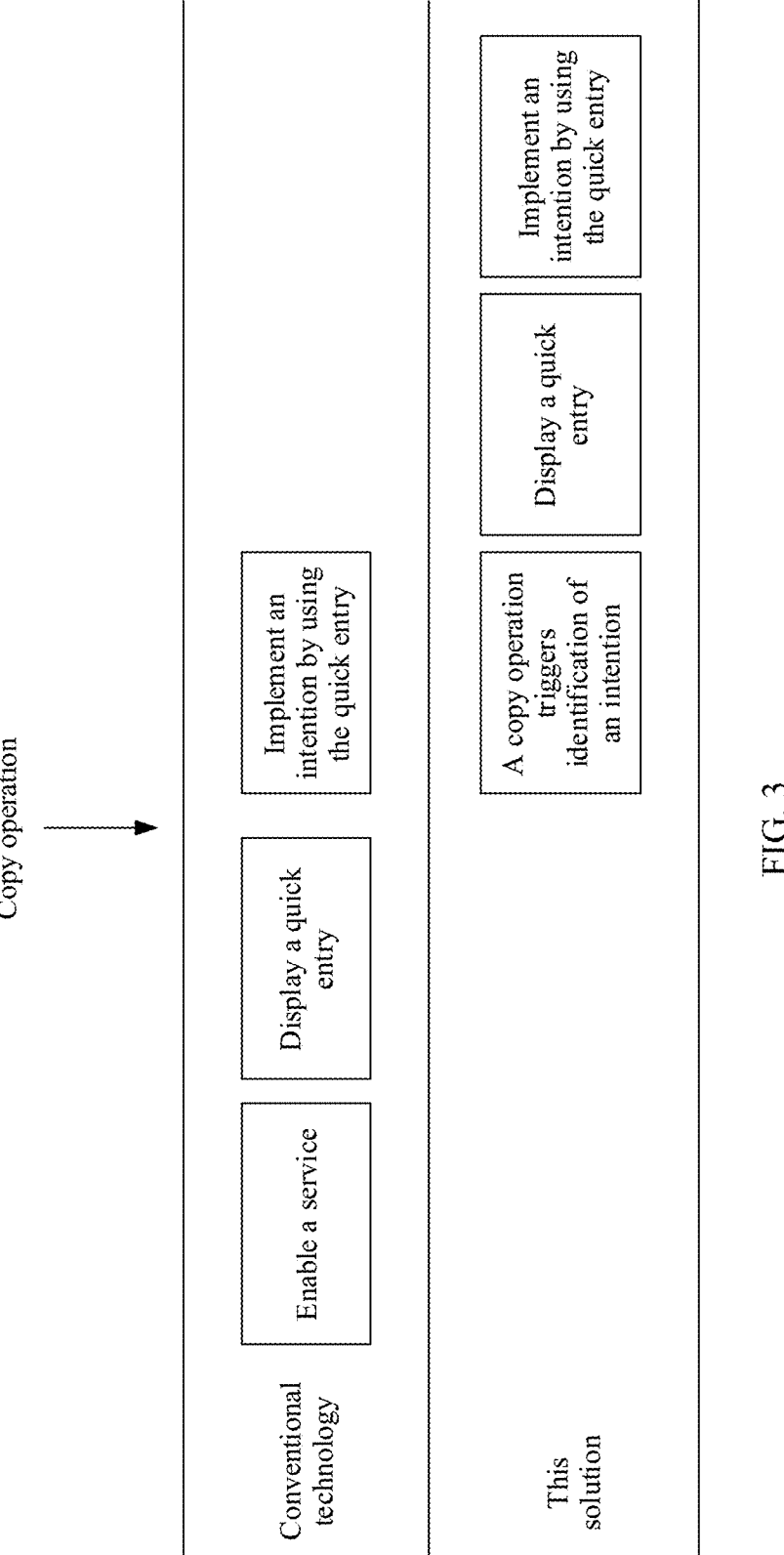
FIG. 3 is a schematic diagram of comparison between a solution of this application and the conventional technology.

As shown in FIG. 3, in the foregoing improved solution, if the user needs to quickly implement the translation function for the copied text, before the user performs a copy operation, the user further needs to manually trigger the mobile phone to enable a related service in advance (for example, the copy to translate service). Only after the related service is enabled, the mobile phone can display the quick entry for the translation function in the interface. Then, after performing the translation operation, the user can tap the quick entry to implement the translation function, so as to obtain the translation result.

Obviously, in the foregoing improved solution, the user needs to enable a related service in advance before performing a specific function by tapping a quick entry after copying a text. If the user does not enable the related service in time, the specific function cannot be implemented quickly. This solution has poor intelligence.

Based on the problem in the foregoing conventional technology, an embodiment of this application provides a translation method, and the method may be applied to an electronic device such as a mobile phone. As shown in FIG. 3, in this embodiment of this application, after the electronic device obtains by means of listening that content in the clipboard changes, the electronic device triggers identification of an intention of a user to copy a text. It should be understood that, after the user performs a copy operation on the text, the copied text is stored in the clipboard, so that the content in the clipboard changes. Therefore, after the content in the clipboard changes means after the user inputs the copy operation. In some embodiments, after the user inputs a copy operation, the electronic device may display, in a current interface, an identifier used to indicate that the electronic device is identifying an intention of the user to input the copy operation. For example, the mobile phone may receive a copy operation performed by the user on the text "enormous" in an interface 401 shown in FIG. 4A. In response to the copy operation, the mobile phone may place the text "enormous" into the clipboard, and may display an interface 402 shown in FIG. 4B, where the interface 402 includes an identifier 403. The identifier 403 is used to indicate that the mobile phone is identifying the intention of the user. For example, the mobile phone may identify the intention according to data such as text content of the copied text and a user portrait.

After the intention is identified, the electronic device may display a quick entry for implementing the intention. For example, after the mobile phone identifies that the user's intention of performing the copy operation on the text "enormous" in FIG. 4A includes: performing translation, adding a memo, and sharing with a chat application, the mobile phone may actively display an interface 404 shown in FIG. 4C, where the interface 404 includes a floating window 405, and the floating window 405 includes quick entries for performing translation, adding a memo, and sharing with a chat application. Alternatively, after the mobile phone identifies the intention of the user performing the copy operation on the text "enormous" in FIG. 4A, the mobile phone may display identification success information in the identifier 403 in FIG. 4B or near the identifier 403. Then, the mobile phone responds to a tap operation performed by the user on the identifier 403 to display the interface 404 shown in FIG. 4C. It should be noted that in the interface 404 shown in FIG. 4C, quick entries for a plurality of intentions are displayed in the same floating window 405. However, in actual implementation, a quick entry for each intention may alternatively be displayed in an independent floating window, which is not specifically limited in this embodiment of this application.

Then, the electronic device may implement a corresponding intention according to the user's selection of the quick entry. For example, after the user taps the "translate" quick entry in the floating window 405 in the interface 404 shown in FIG. 4C, the mobile phone may perform translation. In this way, the translation intention of the user is implemented.

In conclusion, by using the method in this embodiment of this application, compared with a solution in the conventional technology in which a user needs to manually enable a corresponding service in advance to quickly implement a specific function, in this embodiment of this application, an electronic device may trigger identification of an intention of a user based on a copy operation of the user, so that an intention of the copy operation can be intelligently identified without manually enabling a corresponding service by the user. For example, implementation of a fast translation function does not depend on enabling of the "tap to translate" button 202 shown in FIG. 2A. In addition, after the intention is identified, the electronic device may provide a quick entry for implementing the intention to the user. Therefore, various intentions of the user can be flexibly met, and efficiency of human-computer interaction can be improved.

Figure 4A:
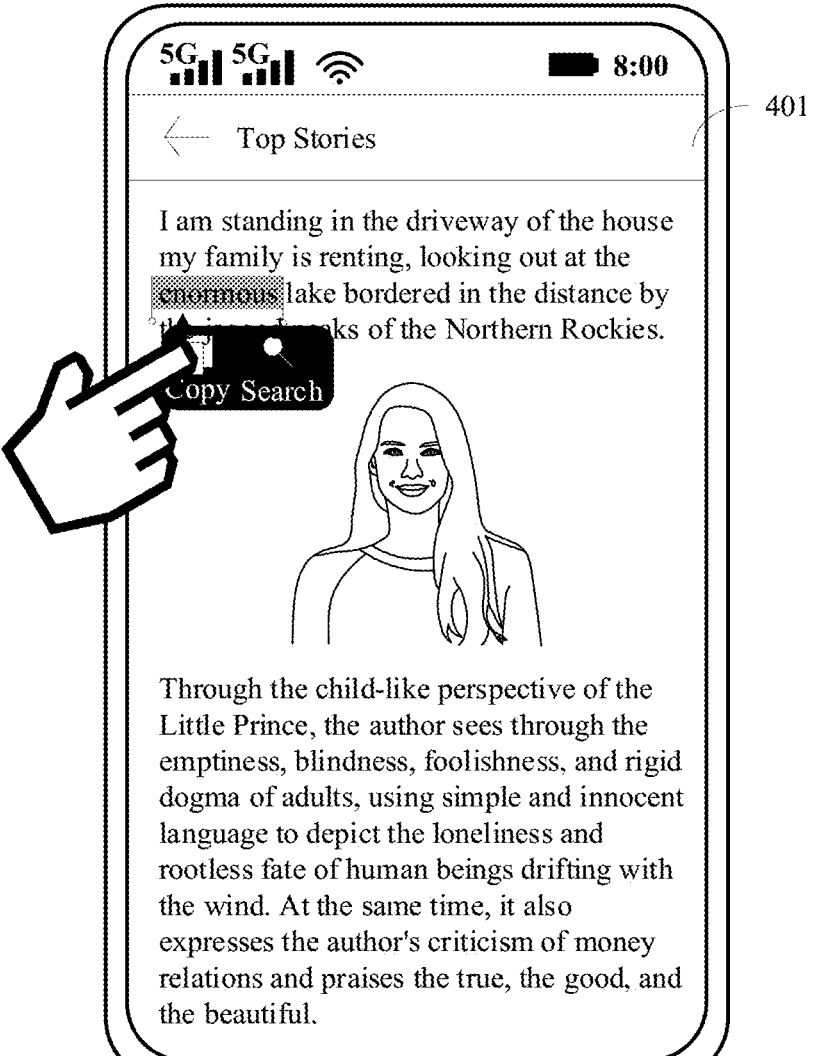

It should be noted that in this embodiment of this application, the copy operation shown in FIG. 4A is mainly used as an example to trigger the mobile phone to identify the intention. However, actual implementation is not limited thereto. For example, the mobile phone may be triggered to identify the intention by using an operation such as a select operation, a long press operation, an underline operation, or a double tap operation on a text. In addition, for ease of description, in this specification, an operation that triggers the mobile phone to identify the intention may be referred to as a first operation. In addition, an interface in which the user inputs the first operation is referred to as a first interface, and an identifier indicating that the electronic device is identifying the intention is referred to as a first identifier.

Figure 4C:
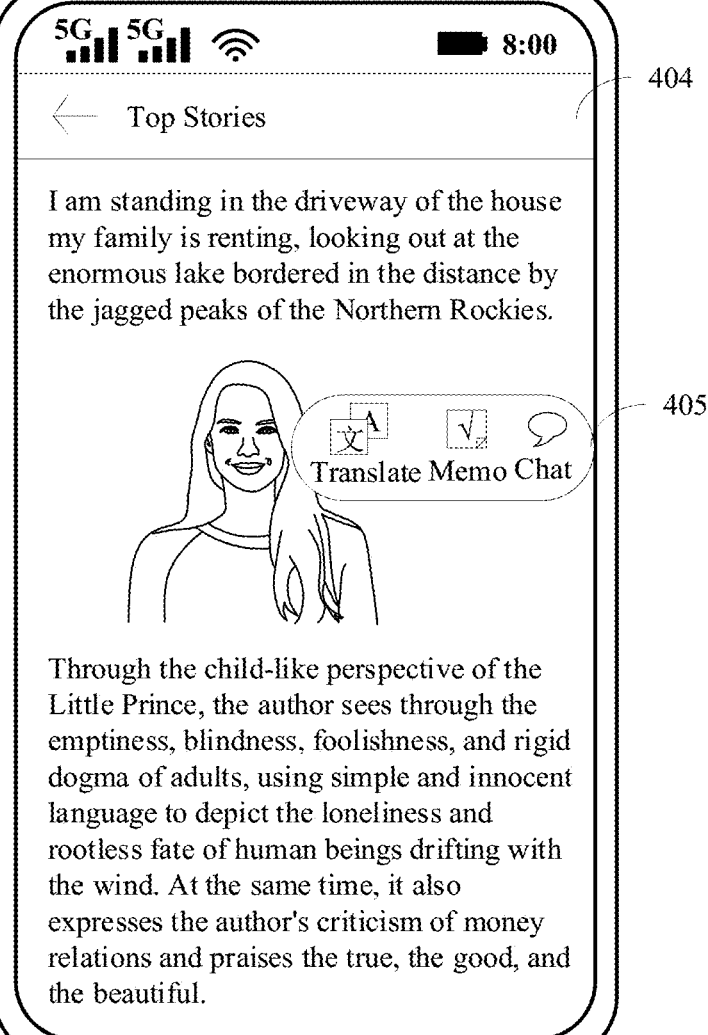

In addition, the quick entry shown in FIG. 4C is merely an example. In actual implementation, an identified intention is not limited thereto. For example, the identified intent may further include one or more of intentions of adding a schedule, sharing with an application, adding to favorites, adding to a dictionary, opening map navigation, and the like. In addition, for ease of description, in this specification, a quick entry for implementing the translation intention is referred to as a first control, and a quick entry for implementing another intention is referred to as a second control. For example, the quick entry "translate" in the floating window 405 in the interface 404 shown in FIG. 4C is referred to as a first control, and the quick entries "memo" and "chat" are referred to as second controls.

For example, the electronic device in this embodiment of this application may be a device such as a mobile phone, a smartphone, a wristband, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the device is not specifically limited in this embodiment of this application.

The following describes implementations of the embodiments of this application in detail with reference to the accompanying drawings.

Figure 5:
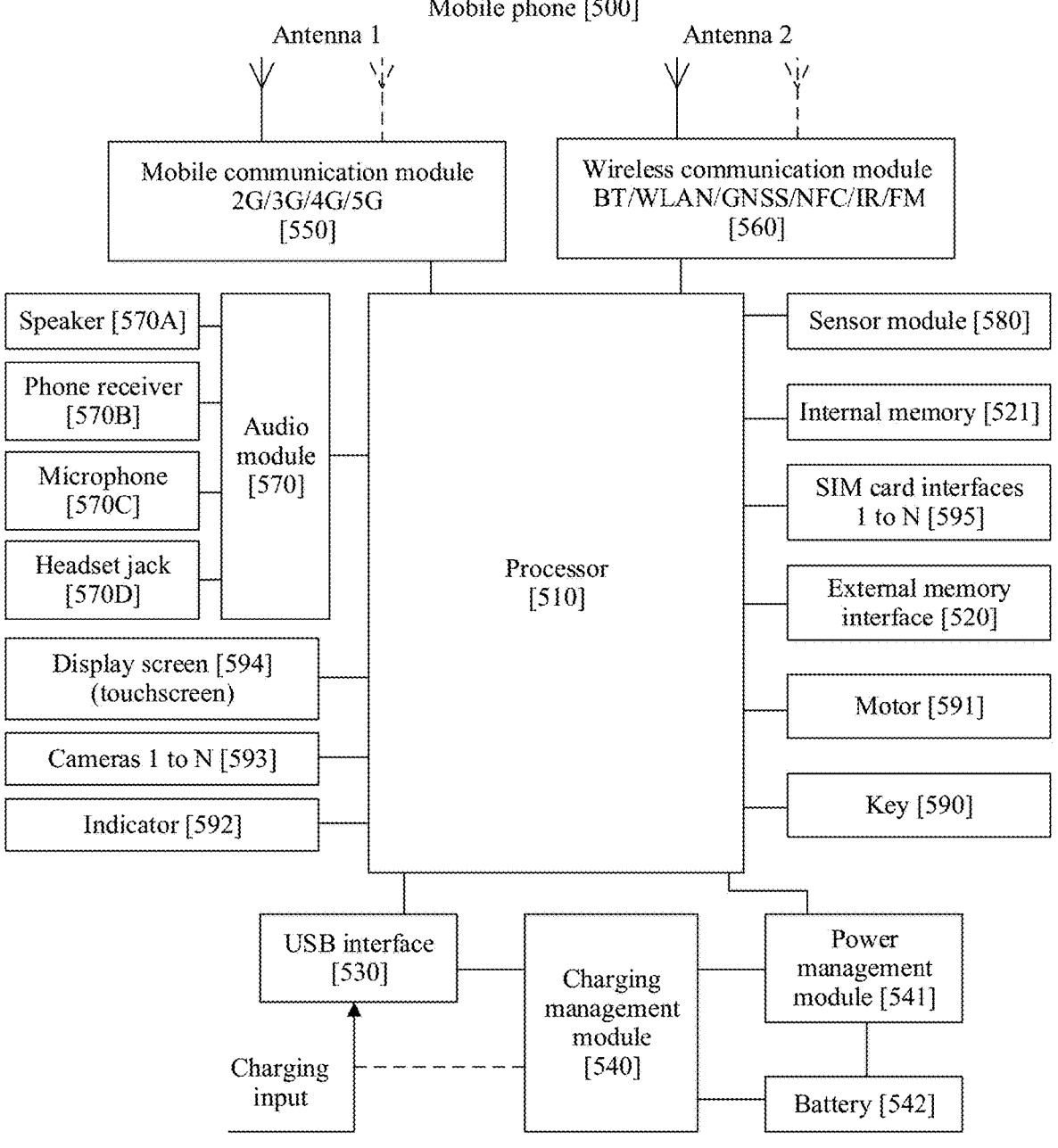
FIG. 5 is a schematic diagram of a hardware structure of a mobile phone according to an embodiment of this application.

FIG. 5 is a schematic diagram of a structure of an electronic device according to an embodiment of this application. As shown in FIG. 5, for example, the electronic device is a mobile phone 500. The mobile phone 500 may include a processor 510, an external memory interface 520, an internal memory 521, a universal serial bus (universal serial bus, USB) interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a key 590, a motor 591, an indicator 592, a camera 593, a display screen 594, a subscriber identity module (subscriber identification module, SIM) card interface 595, and the like.

It may be understood that the structure illustrated in this embodiment does not constitute a specific limitation on the mobile phone 500. In some other embodiments, the mobile phone 500 may include more or fewer components than those shown in the figure, or some components may be combined, or some components may be split, or components are arranged in different manners. The components shown in the figure may be implemented by hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a neural center and a command center of the mobile phone 500. The controller may generate an operation control signal based on an instruction operation code and a time sequence signal, so as to complete control over instruction fetching and instruction execution.

A memory may be further configured in the processor 510, to store an instruction and data. In some embodiments, the memory in the processor 510 is a cache memory. The memory may store an instruction or data that is just used or used cyclically by the processor 510. If the processor 510 needs to use the instruction or the data again, the instruction or the data may be directly invoked from the memory. Repeated access is avoided, and waiting time of the processor 510 is reduced, thereby improving system efficiency.

The charging management module 540 is configured to receive a charging input from a charger. The charger may be a wireless charger, or may be a wired charger. In some embodiments of wired charging, the charging management module 540 may receive charging input of a wired charger by using the USB interface 530. In some embodiments of wireless charging, the charging management module 540 may receive a wireless charging input by using a wireless charging coil of the mobile phone 500. In addition to charging the battery 542, the charging management module 540 may further supply power to the mobile phone by using the power management module 541.

The power management module 541 is configured to connect the battery 542, the charging management module 540, and the processor 510. The power management module 541 receives an input of the battery 542 and/or the charging management module 540, to supply power to the processor 510, the internal memory 521, an external memory, the display screen 594, the camera 593, the wireless communication module 560, and the like. The power management module 541 may be further configured to monitor parameters such as a battery capacity, a cycle count of a battery, and a battery health state (leakage and impedance). In some other embodiments, the power management module 541 may alternatively be disposed in the processor 510. In some other embodiments, the power management module 541 and the charging management module 540 may alternatively be disposed in a same device.

A wireless communication function of the mobile phone 500 may be implemented by using the antenna 1, the antenna 2, the mobile communication module 550, the wireless communication module 560, the modem processor, a baseband processor, and the like.

The mobile phone 500 implements a display function by using the GPU, the display screen 594, the application processor, and the like. The GPU is a microprocessor for image processing, and is connected to the display screen 594 and the AP. The GPU is configured to perform mathematical and geometric calculation, and is configured to render graphics. The processor 510 may include one or more GPUs, and execute program instructions to generate or change display information.

The display screen 594 is configured to display an image, a video, and the like. The display screen 594 is the foldable screen (such as a flexible foldable screen or a multi-screen foldable screen). The display screen 594 may include a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like.

The mobile phone 500 can implement a photographing function by using the ISP, the camera 593, the video codec, the GPU, the display screen 594, the APP processor, and the like.

The external memory interface 520 may be configured to connect to an external storage card such as a micro SD card, to extend a storage capability of the mobile phone 500. The external storage card communicates with the processor 510 by using the external memory interface 520, to implement a data storage function, for example, storing a media file such as a music or a video in the external storage card.

The internal memory 521 may be configured to store computer executable program code, and the executable program code includes instructions. The processor 510 runs the instructions stored in the internal memory 521, to perform various function APPs and data processing of the mobile phone 500. The internal memory 521 may include a program storage area and a data storage area. The program storage area may store an operating system, an application required by at least one function (such as a voice playing function and an image playing function), and the like. The data storage area may store data (for example, audio data and a phone book) and the like created in a process of using the mobile phone 500. In addition, the internal memory 521 may include a high-speed random access memory, and may further include a non-volatile memory, for example, at least one disk storage device, a flash memory device, or a universal flash storage (universal flash storage, UFS).

The mobile phone 500 may implement an audio function such as music playing or recording by using the audio module 570, the speaker 570A, the receiver 570B, the microphone 570C, the headset jack 570D, the application processor, for example, music playing and sound recording.

The key 590 includes a power key, a volume key, and the like. The key 590 may be a mechanical key, or a touch-type key. The mobile phone 500 may receive key input, and generate key signal input related to a user setting and function control of the mobile phone 500.

The motor 591 may generate a vibration prompt. The motor 591 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different areas of the display screen 594, the motor 591 may also correspond to different vibration feedback effects. Different application scenarios (for example, a time prompt, information receiving, an alarm clock, and a game) may also correspond to different vibration feedback effects. A touch vibration feedback effect may be further customized.

The indicator 592 may be an indicator light, and may be configured to indicate a charging state or a battery change, or may be further configured to indicate a message, a missed call, a notification, or the like.

The SIM card interface 595 is configured to connect to a SIM card. The SIM card may be inserted into the SIM card interface 595 or plugged from the SIM card interface 595, to come into contact with or be separated from the mobile phone 500. The mobile phone 500 may support one or N SIM card interfaces, and N is a positive integer greater than 1. The SIM card interface 595 may support a nano-SIM card, a micro-SIM card, a SIM card, and the like. A plurality of cards may be inserted into a same SIM card interface 595 at the same time. Types of the plurality of cards may be the same or different. The SIM card interface 595 may be compatible with different types of SIM cards. The SIM card interface 595 may also be compatible with an external storage card. The mobile phone 500 interacts with a network by using the SIM card to implement functions such as conservation and data communication. In some embodiments, the mobile phone 500 uses an eSIM, that is, an embedded SIM card. The eSIM card may be embedded in the mobile phone 500, and cannot be separated from the mobile phone 500.

Figure 6A:
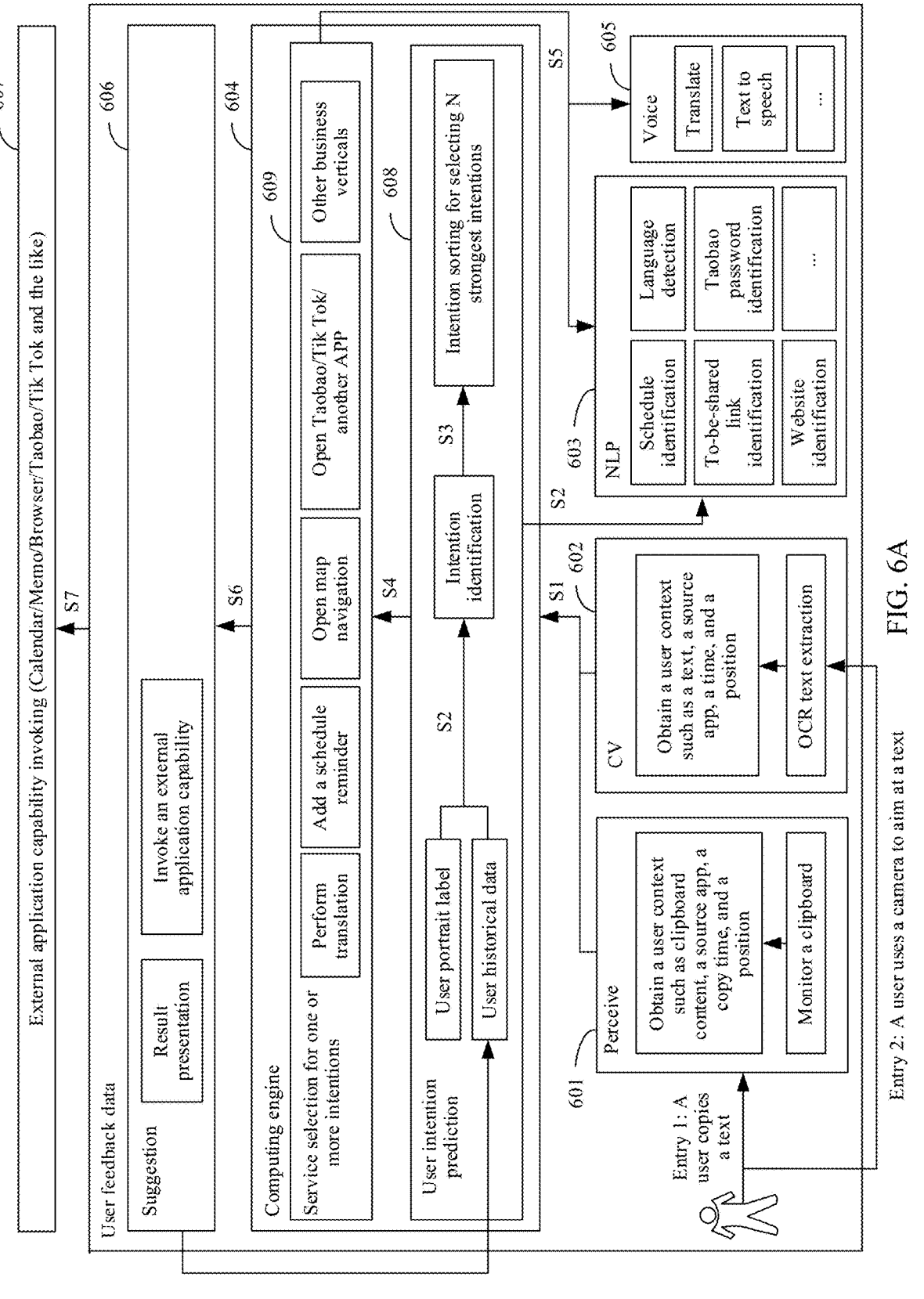
FIG. 6A is a schematic diagram of software function modules of a mobile phone according to an embodiment of this application.

FIG. 6A is a schematic diagram of software function modules of a mobile phone 500 according to an embodiment of this application. As shown in FIG. 6A, the software function modules of the mobile phone 500 include a sensing module 601, a computer vision (computer vision, CV) module 602, a natural language processing (Natural Language Processing, NLP) module 603, a computing engine 604, a voice (Voice) module 605, a recommendation module 606, and a plurality of applications 607. The computing engine 604 further includes an intention prediction module 608 and a service selection module 609.

As shown in FIG. 6A, after a user copies a text in a current interface (which may also be referred to as a first interface), the sensing module 6o*i* may monitor a clipboard, and learn of clipboard content (such as the copied text), and a user context such as a source APP (such as a news APP or a read APP), a copy time, and a copy position. It should be understood that an action of a function module in the mobile phone 500 is essentially an action of the mobile phone. For example, an action of the sensing module 6o*i* for obtaining context information may also be understood as an action of the mobile phone 500. Other function modules are also similar. Details are not described in this specification.

Figure 6B:
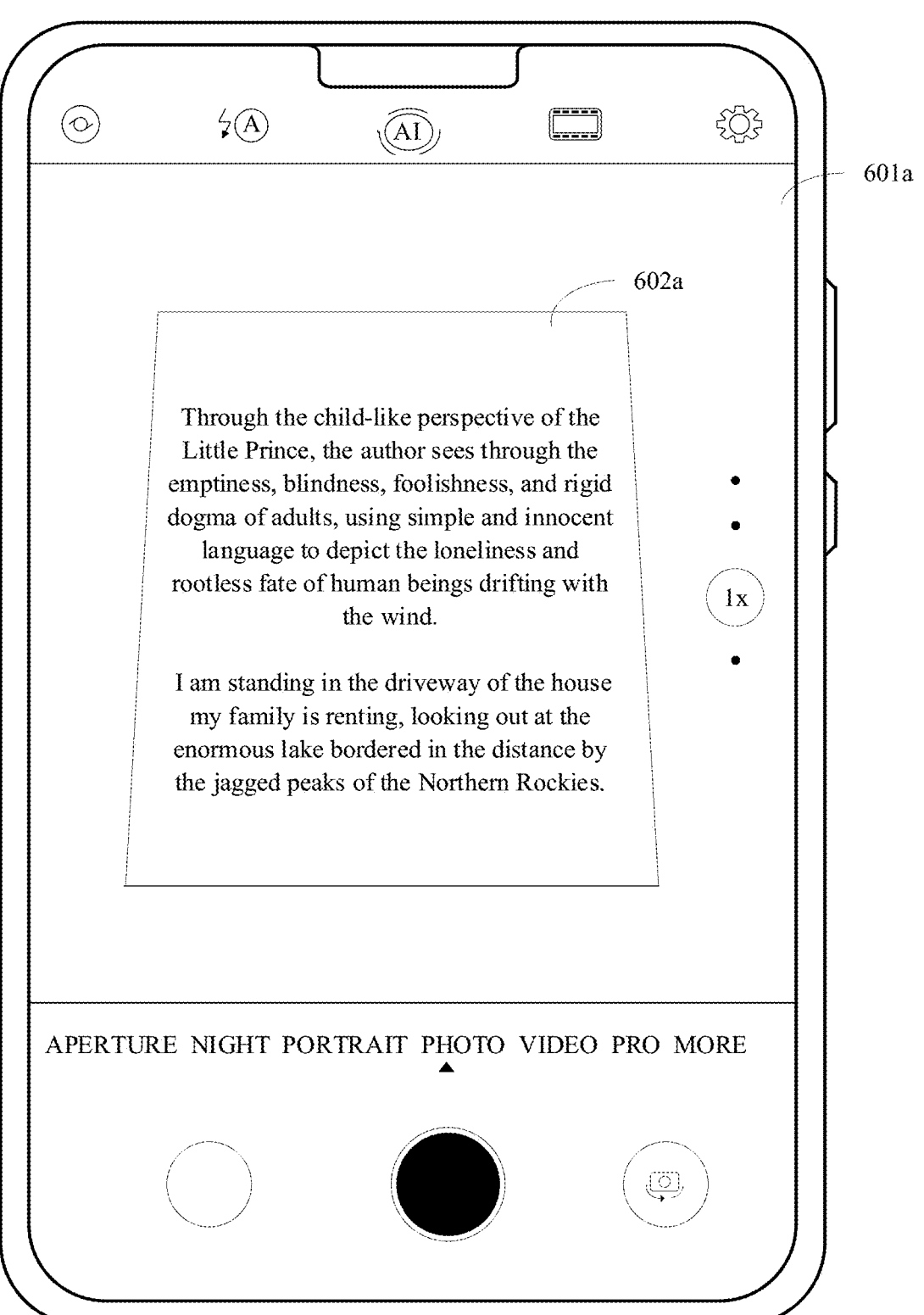
FIG. 6B is a schematic diagram 4 of a mobile phone interface according to an embodiment of this application.

The CV module 602 is configured to: after the user uses a camera to aim at a text, extract the camera-aimed text by using an optical character recognition (Optical Character Recognition, OCR) technology, and obtain a user context such as a text, a source APP of the text, a collection time of the camera, and a collection position. For example, after a camera function of the mobile phone is enabled, the mobile phone may display an interface 601a shown in FIG. 6B. The interface 601a includes a preview image collected by the camera, and the preview image includes text content 602a. In this case, the CV module 602 may extract a text in the text content 602a and obtain related context data.

The NLP module 603 may identify the foregoing copied text or the text extracted by using the OCR technology. Specifically, the NLP module 603 may identify that the text is at least one of a schedule, a to-be-shared link, a Taobao password, a web address, or the like. Alternatively, the NLP module 603 may further identify a language of the text.

The intention prediction module 608 may identify an intention of the user, for example, identify an intention of copying a text or identify an intention of the camera to aim at a text. After intentions are identified, the intentions may be further sorted, so as to select a relatively strong intention. The service selection module 609 may perform a single task, a plurality of tasks, and selection on a current service.

The voice module 605 may be configured to process a voice-related task, for example, may be configured to pronounce a target text (for example, English), for another example, may be configured to pronounce a text (Text-ToSpeech, TSS).

The recommendation module 606 may display a quick entry for implementing an intention in a current interface. The quick entry may be linked to a corresponding APP. That is, the recommendation module 606 may invoke an external APP. For example, to perform translation, a translation APP needs to be invoked. In addition, the recommendation module 606 may further update a user portrait label according to an operation performed by the user on the quick entry.

The plurality of applications 609 may receive invocation and implement an intention.

By using the foregoing software system, the mobile phone can complete the translation method provided in this embodiment of this application. Specifically, as shown in FIG. 6A, the method includes S1-S7.

S1: The sensing module 601 sends a user context to the intention prediction module 608, so that the intention prediction module 608 predicts an intention of a user to copy a text. Alternatively, the CV module 602 sends the user context to the intention prediction module 608, so that the intention prediction module 608 predicts an intention of the user to aim the camera at the text. It should be noted that in this embodiment of this specification, a scenario in which a copy operation triggers the mobile phone to identify an intention is mainly used as an example to describe the solution of this application. However, actual implementation is not limited thereto. The translation method provided in this application may be further used in the foregoing scenario in which the camera aiming at the text triggers the mobile phone to identify the intention (the scenario shown in FIG. 6B).

S2: The intention prediction module 608 receives the user context sent by the sensing module 601, and sends the copied text in the user context to the NLP module 603. The NLP module 603 receives the copied text sent by the intention prediction module 608 and identifies a type and a language of the copied text, for example, identifies whether the copied text is a schedule, a link, a Taobao password, a web address, or the like. Then, the intention prediction module 608 may identify the intention of the user to copy the text according to a user portrait label, user historical data, and/or an identification result of the NLP module 603. The user portrait label mainly includes labels such as occupation and age. The user historical data mainly refers to statistics data of various operations performed after the user historically copies the text, such as frequency and times.

For example, performing translation is used as an example. If the NLP module 603 identifies that the language of the copied text is not a current system language of the mobile phone (that is, a default language set on the mobile phone), it may be identified that the intention of the user includes performing translation. For example, if the default language set on the mobile phone is Simplified Chinese, a first language may be a language other than Simple Chinese such as English, Japanese, or French. Generally, if the default language set on the mobile phone is a language familiar to the user, the language does not need to be translated.

In this specification, for ease of description, the default language set on the mobile phone is referred to as a second language, and a language other than the second language is referred to as a first language.

In some embodiments, the NLP module 603 further needs to identify that a language of the copied text is a preset language, where the preset language is a language supported for translation by a mobile phone system or a translation application on the mobile phone, so that the intention of the user can be identified as including performing translation. If the mobile phone does not support translation of the language of the copied text at all, a translation result cannot be obtained. In this case, it is identified that there is no intention of performing translation.

In some other embodiments, the NLP module 603 further needs to identify that the copied text is not a character string that has a specific meaning, such as a website link, an email address, or a password generated by using a machine (such as a Taobao password), so as to identify that the intention of the user includes preforming translation. The foregoing character strings with specific meanings are usually merely identifiers, for example, used to distinguish between different web pages, different email addresses, different Taobao commodities, and do not have language meanings. Therefore, there is no translation requirement.

S3: The intention prediction module 608 sorts identified intentions, and selects N intentions with a highest score therefrom. The intention prediction module 608 may score the identified intentions according to frequency of using target functions corresponding to the identified intentions by the user. For example, the identified intentions include performing translation, adding a memo, and sharing with a chat application. In historical usage data of the user, if the user performs translation most frequently after copying the text, the intention of performing translation has the highest score. Then, the intention prediction module 608 sends the N intentions to the service selection module 609.

S4: After receiving the N intentions, the service selection module 609 selects a target function that can implement the N intentions from the mobile phone. For example, the target function includes at least one of functions such as performing translation, adding a schedule reminder, opening map navigation, opening Taobao, and opening Tik Tok. Then, the service selection module 609 sends information about the target function to the recommendation module 606.

S5: After the service selection module 609 completes service selection, if a selected target function includes a function that requires voice support, the service selection module 609 notifies the voice module 605 to start, so as to assist in implementing the intention. For example, performing translation requires loud pronunciation, and opening map navigation requires voice navigation.

S6: After receiving the target function, the recommendation module 606 displays a quick entry for the target function on a current interface (for example, an interface on which the copied text is located). In addition, after displaying the quick entry, the recommendation module 605 may receive a select operation performed by the user on the quick entry. The recommendation module 605 may link to a corresponding APP in response to the select operation (for example, a tap operation or a long press operation, which may also be referred to as a second operation) performed by the user on the quick entry.

For ease of user operation, a quick entry for implementing an intention is usually completely presented in an interface. If there are a plurality of intentions, a plurality of quick entries corresponding to the plurality of intentions are tiled in the interface. For example, the mobile phone may display an interface 404 shown in FIG. 4C. The interface 404 includes a floating window 405, and the floating window 405 displays quick entries for three intentions: performing translation, adding a memo, and sharing with a chat APP. In addition, the three quick entries are tiled.

It should be understood that, when the quick entries are complete and tiled in the interface, this may block interface content. Based on this, in some embodiments, after the quick entry is displayed, if the mobile phone (for example, the recommendation module 606) does not detect, within a preset time, the select operation performed by the user on the quick entry, the mobile phone may retract the quick entry onto an edge of the interface. Therefore, blocking for interface content can be reduced.

For example, after the mobile phone displays three quick entries for performing translation, adding a memo, and sharing with a chat APP in the floating window 405 in the interface 404 shown in FIG. 4C, if the mobile phone does not detect, within the preset time, an operation performed by the user on the foregoing three quick entries, the mobile phone may display an interface 701 shown in FIG. 7. A right edge of the interface 701 includes a floating window 702, and three quick entries in the floating window 702 are stacked.

Figure 8:
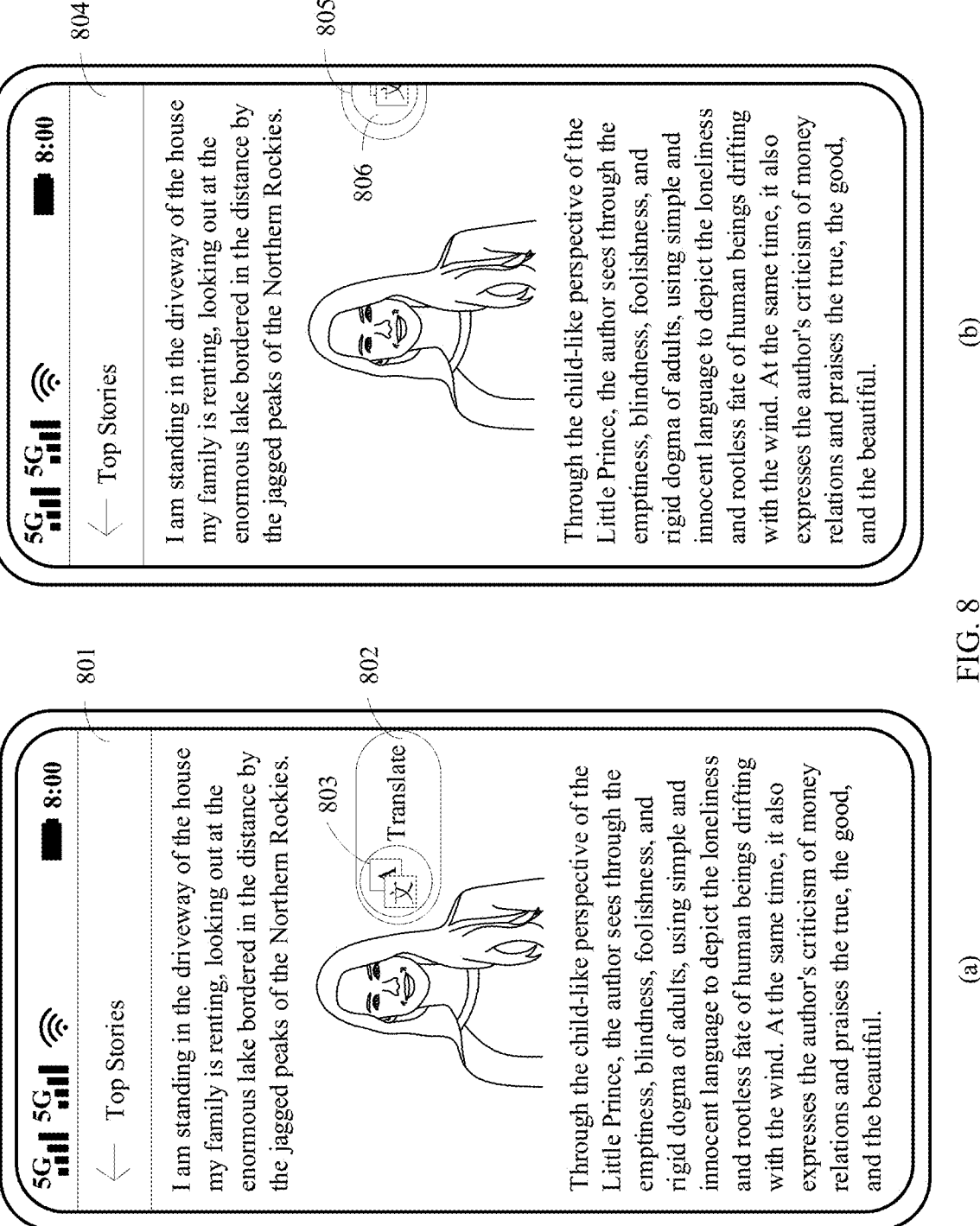
FIG. 8 is a schematic diagram 6 of a mobile phone interface according to an embodiment of this application.

For another example, after only the intention of performing translation is identified, the mobile phone may display an interface 8oi shown in (a) in FIG. 8. The interface 8oi includes a floating window 802. Only a quick entry 803 for implementing translation is provided in the floating window 802. Then, if the mobile phone does not detect, within the preset time, a tap operation performed by the user on the quick entry 803, the mobile phone may display an interface 804 shown in (b) in FIG. 8. A right edge of the interface 804 includes a floating window 805, and a quick entry 806 for implementing translation is only partially displayed in the floating window 805.

It should be noted that in the example of (a) in FIG. 8 above, only the quick entry for implementing translation is displayed after the intention of performing translation is identified. In some embodiments, a translation result may also be displayed in the quick entry for performing translation after the intention of performing translation is identified. The translation result may be a source text (such as a copied text) and/or a target text. In this way, the mobile phone may directly present the translation result according to the identified intention of performing translation. Therefore, the intention of the user to perform translation can be quickly met.

Figure 9:
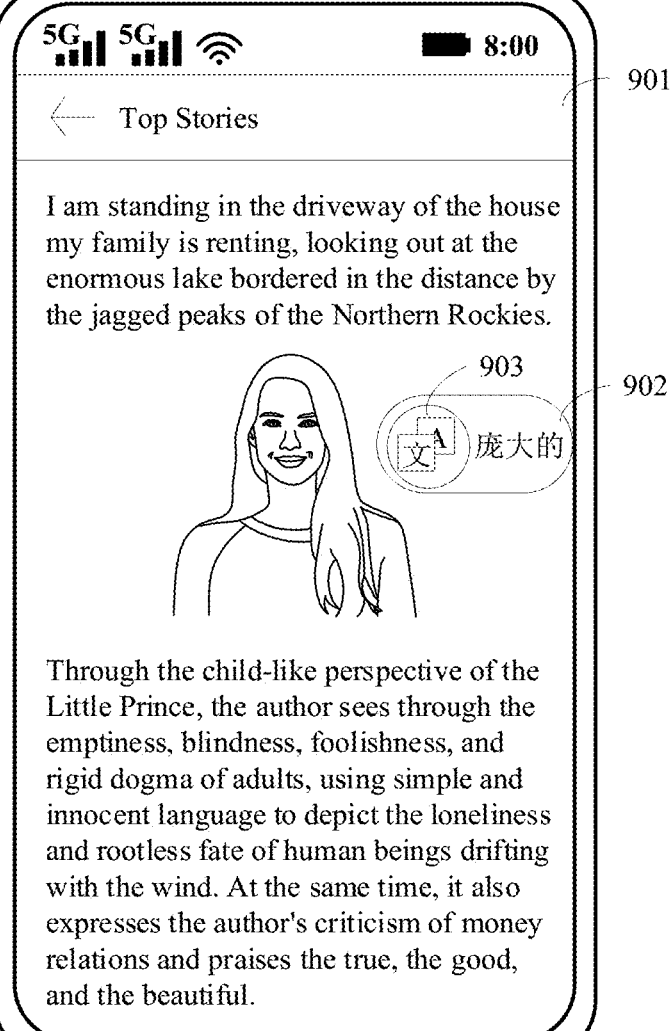
FIG. 9 is a schematic diagram 7 of a mobile phone interface according to an embodiment of this application.

For example, after it is identified that the intention of performing translation exists, the mobile phone may display an interface 901 shown in FIG. 9. The interface 901 includes a floating window 902. The floating window 902 displays a quick entry 903 for implementing translation, and further displays a translation result " 庞大的 ". For example, if the text "enormous" in FIG. 4A is the source text, the translation result " 庞大的 " in FIG. 9 is the target text.

In addition, after the quick entry for implementing the intention is displayed, the mobile phone may receive an operation 1 (which may also be referred to as a fifth operation) of the user. The operation 1 is used to trigger the mobile phone to exit the interface on which the quick entry is currently displayed (that is, the current interface). For example, the operation 1 is an operation of sliding rightward from the left edge of the current interface. Alternatively, the operation 1 is used to trigger the mobile phone to exit an application to which the current interface belongs. For example, the operation 1 is an operation of sliding upward from a bottom of the current interface. In response to the operation 1, the mobile phone may close the quick entry for implementing the intention. In this way, compared with a manner of displaying a quick entry for a long time after a corresponding service (for example, a copy to translate service) is enabled in the conventional technology, in the solution of this application, a quick entry for implementing an intention can be automatically closed after the intention of the user disappears, and use of the mobile phone by the user may be prevented from being affected. The user is not required to manually disable the corresponding service to trigger closing of the quick entry.

Figure 10:
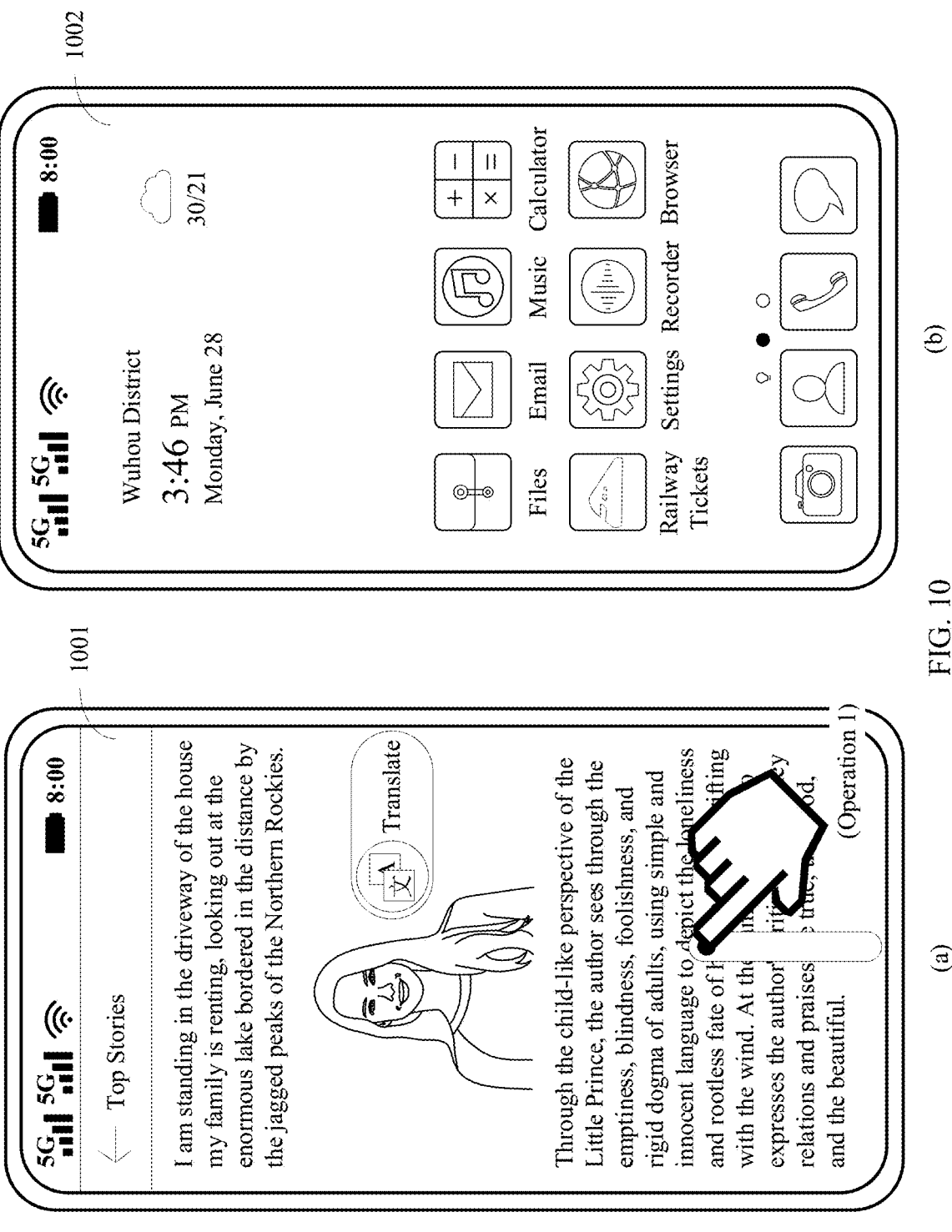
FIG. 10 is a schematic diagram 8 of a mobile phone interface according to an embodiment of this application.

For example, the operation 1 is an operation of sliding upward from the bottom of the current interface. The mobile phone may receive an operation performed by the user to slide upward from the bottom of an interface 1001 shown in (a) in FIG. 10. The mobile phone may display a main interface 1002 shown in (b) in FIG. 10 in response to the operation performed by the user to slide upward from the bottom of the interface 1001 shown in (a) in FIG. 10. The main interface 1002 does not include the quick entry for implementing translation, and the interface 1001 includes the quick entry for implementing translation.

S7: After receiving an invoking request from the recommendation module 605, any application in the plurality of applications 609 enables the application, so that the user implements a corresponding intention.

It can be learned that by using the method in this embodiment of this application, a mobile phone can trigger identification of an intention of a user after obtaining by means of listening that content in the clipboard changes or after a camera aims at a text, and provide a quick entry for implementing the intention to the user. Therefore, after the user copies the text or the camera aims at the text, implementing of a corresponding intention can be quickly triggered, thereby improving efficiency of human-computer interaction.

Further, for the intention of performing translation, in the conventional technology shown in FIG. 2A, FIG. 2B, and FIG. 2C, after each time of translation is completed, the user needs to close a translation result (step 1), select a new text (step 2) and copy (step 3) again, and then tap the quick entry for the translation function (step 4) again to complete the next time of translation, that is, at least four operations are required to complete the next time of translation. This leads to a complex process of continuous translation.

Figure 11A:
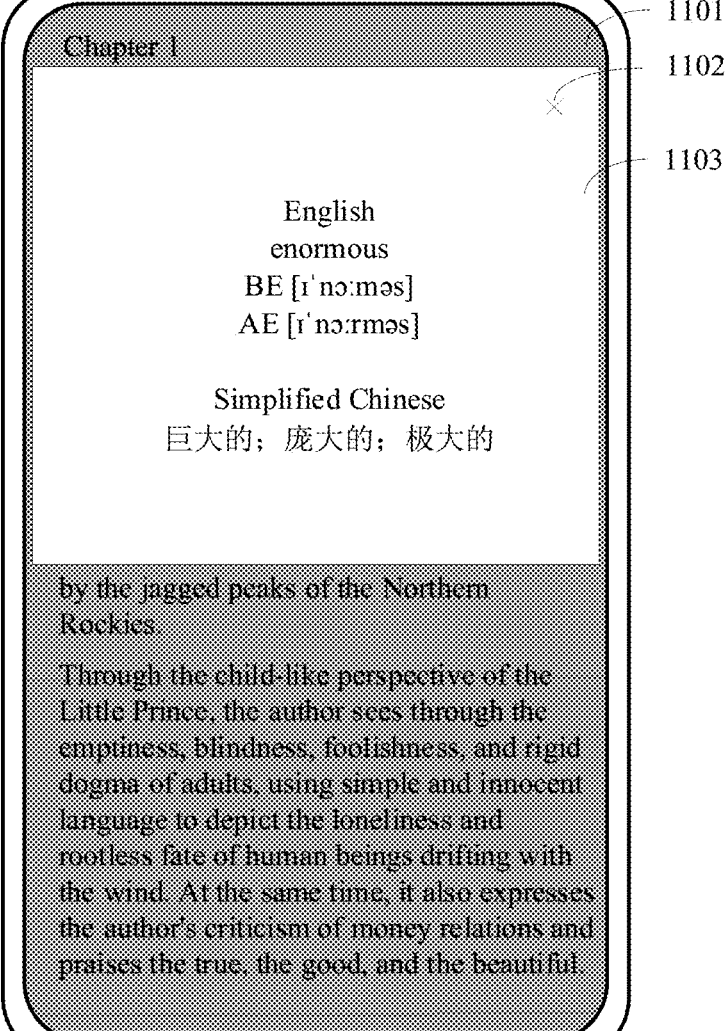
Figure 11D:
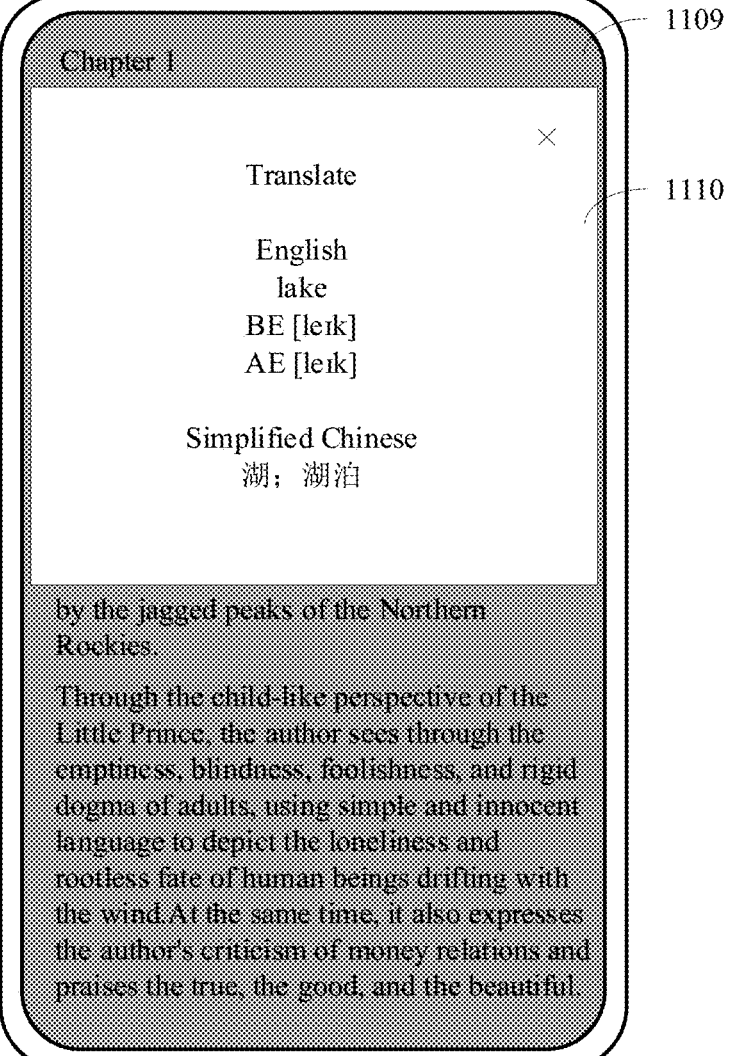

For example, after the user copies the text "enormous" in FIG. 2C, the mobile phone may receive a tap operation performed by the user on the floating window 207 in FIG. 2C. In response to the tap operation performed by the user on the floating window 207, the mobile phone may display an interface 1101 shown in FIG. 11A. The interface 1101 includes a pop-up window 1102, and the pop-up window 1102 includes a translation result of the copied text "enormous". The pop-up window 1102 further includes a close control "x" 1103. If the user needs to continue translation, the user needs to tap the close control "x" 1103. In response to a tap operation performed by the user on the close control "x" 1103, the mobile phone may close the pop-up window that displays the translation result, and display an interface 1104 shown in FIG. 11B. The interface 1104 includes a floating window 1105. After closing the translation result, the user may re-select a text "husband" in an interface 1106 shown in FIG. 11C and tap the "copy" button 1107 to copy the text "husband". Then, the user needs to further tap a pop-up window 1108 in the interface 1106 shown in FIG. 11C to trigger a new time of translation. That is, after copying of "husband" is completed, an interface 1109 shown in FIG. 11D can be displayed only when the mobile phone responds to a tap operation performed by the user on the pop-up window 1108. The interface 1109 includes a pop-up window 1110, and the pop-up window 1110 includes a translation result of the copied text "husband".

Figure 12:
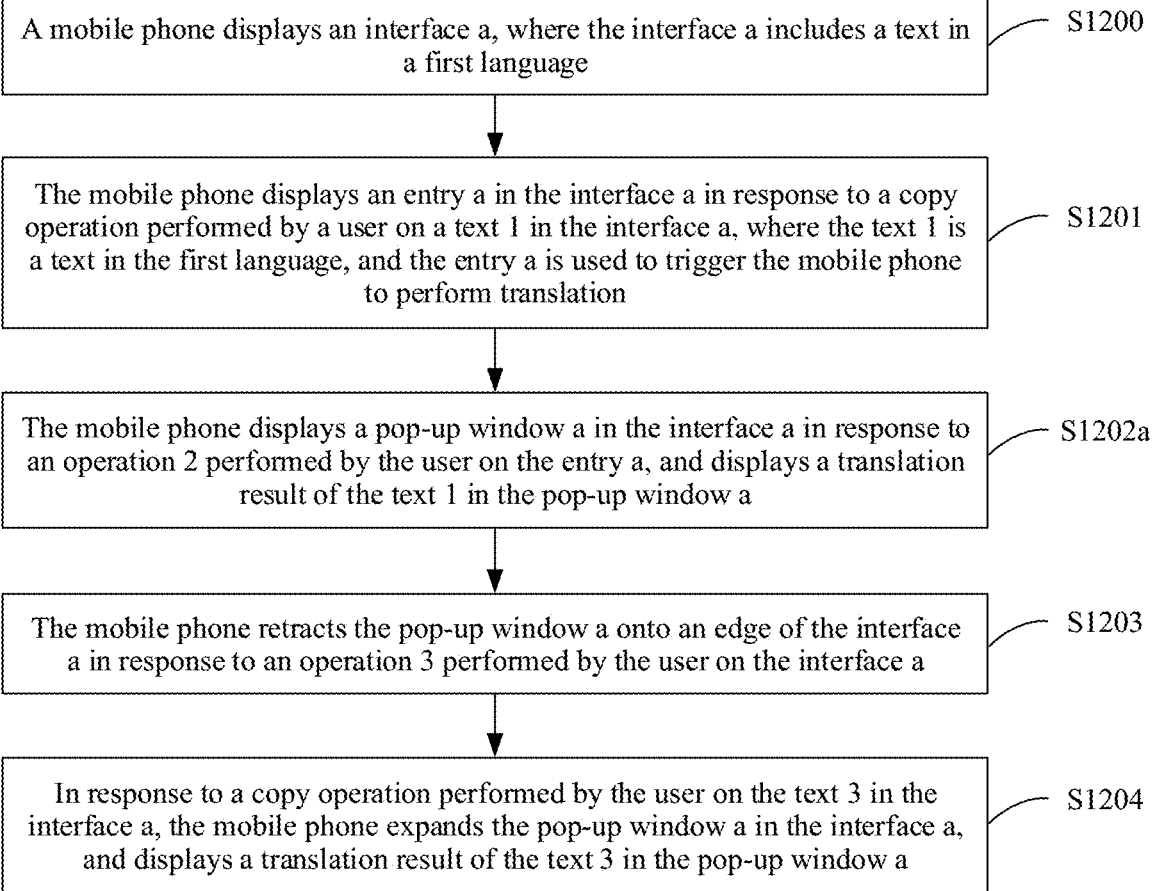
FIG. 12 is a flowchart 1 of a translation method according to an embodiment of this application.

Based on this, an embodiment of this application provides a translation method, which may be applied to a mobile phone that has the foregoing hardware structure and software system. In this embodiment, a plurality of times of continuous fast translation can be implemented for a case in which an intention of performing translation is identified. Specifically, as shown in FIG. 12, the method includes S1200-S1204.

S1200: A mobile phone displays an interface a, where the interface a includes a text in a first language.

The interface a is a currently displayed interface, and may also be referred to as a first interface. The first language is a language other than a default language set on the mobile phone. For example, if the default language set on the mobile phone is Simplified Chinese, the first language may be English, Japanese, French, or the like.

S1201: The mobile phone displays an entry a in the interface a in response to a copy operation performed by a user on a text 1 in the interface a. The text 1 is a text in first language, and the entry a is used to trigger the mobile phone to perform translation.

The text 1 may be referred to as a first text. The copy operation is an operation that triggers the mobile phone to identify an intention, and therefore may also be referred to as a first operation. The entry a is a quick entry for performing translation. Therefore, the entry a may also be referred to as a first control.

In response to the copy operation performed by the user on the text 1 in the interface a, the mobile phone may trigger the mobile phone to identify an intention of the copy operation. If the text 1 is a text in the first language, the mobile phone may identify that the intention of the copy operation includes an intention of performing translation. The first language is not the default language set on the mobile phone, and therefore, an intention of the user to perform translation most likely exists. For example, the text 1 needs to be translated into the default language set on the mobile phone.

In some embodiments, the first language further needs to be a preset language (that is, a language supported for translation by a mobile phone system or an application on the mobile phone); and/or the text 1 cannot be a website link, an email address, or a password generated by using a machine. In this case, the mobile phone can identify that an intention of performing translation exists.

There are two cases in which the intention of the user to copy the text 1 in the interface a includes the intention of performing translation:

In a first case, the intention of the user to copy the text 1 in the interface a is merely the intention of performing translation. In the first case, the mobile phone usually displays only the entry a in the interface a. For example, the interface 8oi shown in (a) in FIG. 8 is a display result corresponding to the first case. The interface 8oi includes only the quick entry 803 used to trigger the mobile phone to perform translation, that is, the quick entry 803 is an entry a.

In a second case, the intention of the user to copy the text 1 in the interface a includes performing translation and another intention, and the another intention may be at least one of an intention of adding a schedule, an intention of sharing, an intention of adding a memo, or the like. For example, the interface 404 shown in FIG. 4C is a display result corresponding to the second case. The floating window 405 in the interface 404 includes not only a quick entry (that is, an entry a) for performing translation, but also a quick entry for adding a memo and a quick entry for sharing with a chat APP.

In the following embodiment, the solution of this application is mainly described in the first case.

It should be noted that, in this embodiment, although only that the mobile phone actively identifies a scenario in which the user performs translation and the entry a is displayed is used for description, actual implementation is not limited thereto. For example, the entry a may alternatively be displayed after the user enables a related service (for example, a copy to translate service) in advance. Alternatively, the entry a may be displayed in a floating window for a long time after the mobile phone is started.

Different from S1201, if the interface a further includes a text in the default language (that is, a second language) set on the mobile phone, the mobile phone does not display the entry a in the interface a in response to a copy operation performed by the user on a text 4 (which may also be referred to as a third text) in the interface a. The text 4 is a text in the default language set on the mobile phone. That is, if the copy operation is aimed at the default language set on the mobile phone, the mobile phone does not identify an intention of performing translation, and therefore does not display the entry a.

In this embodiment of this application, after displaying the entry a, the mobile phone may trigger, by using the entry a, the mobile phone to translate the text 1 copied by the user. In this way, after the entry a is displayed, the user does not need to perform selection again, and the mobile phone can quickly present a translation result of the text 1, specifically, as shown in S1202a.

S1202a: The mobile phone displays a pop-up window a in the interface a in response to an operation 2 performed by the user on the entry a, and displays a translation result of the text 1 in the pop-up window a.

The operation 2 may trigger the mobile phone to perform translation. Therefore, the operation 2 may also be referred to as a second operation. The pop-up window a may be referred to as a first pop-up window. The translation result of the text 1 may be referred to as a first translation result.

The translation result of the text 1 includes a translation of the text 1. The translation of the text 1 may be referred to as a first translation. By default, the translation of the text 1 is a text in the default language set on the mobile phone for the user to understand.

Translation may be performed by the mobile phone system or a translation application on the mobile phone.

Before S1202a, the mobile phone may receive the operation 2 performed by the user on the entry a. The operation 2 may be a tap operation or a long press operation.

For example, the operation 2 is a tap operation. It is assumed that the text 1 is the text "enormous" in interface 401 shown in FIG. 4A, and the entry a is the quick entry 803 in the interface 801 shown in (a) in FIG. 8. The mobile phone may receive a tap operation performed by the user on the quick entry 803 in the interface 801 shown in (a) in FIG. 8. The mobile phone may display an interface a 1301 shown in (a) in FIG. 13 in response to the tap operation performed by the user on the quick entry 803 in the interface 801 shown in (a) in FIG. 8. The interface 1301 includes a pop-up window a 1302. A translation result of "enormous" is displayed in the pop-up window a 1302, for example, the source text "enormous" and the target text "巨大的；庞大的；极大的".

In some embodiments, the pop-up window a further includes a translation identifier. The translation identifier may be a translation icon and/or a translation character, and is used to indicate that a function of the pop-up window a is to display a translation result. For example, the pop-up window a 1302 in the interface a 1301 shown in (a) in FIG. 13 includes a translation identifier 1305.

In some other embodiments, the pop-up window a further includes a language switch button that is used to trigger the mobile phone to switch the language of the source text and the language of the target text. For example, the pop-up window a 1302 in the interface a 1301 shown in (a) in FIG. 13 includes a language switch button 1306.

In some other embodiments, the pop-up window a further includes a control a, used to trigger the mobile phone to retract the pop-up window a (for details, refer to the description in S1203). For example, the pop-up window a 1302 in the interface a 1301 shown in (a) in FIG. 13 includes a control a 1307.

Figure 13:
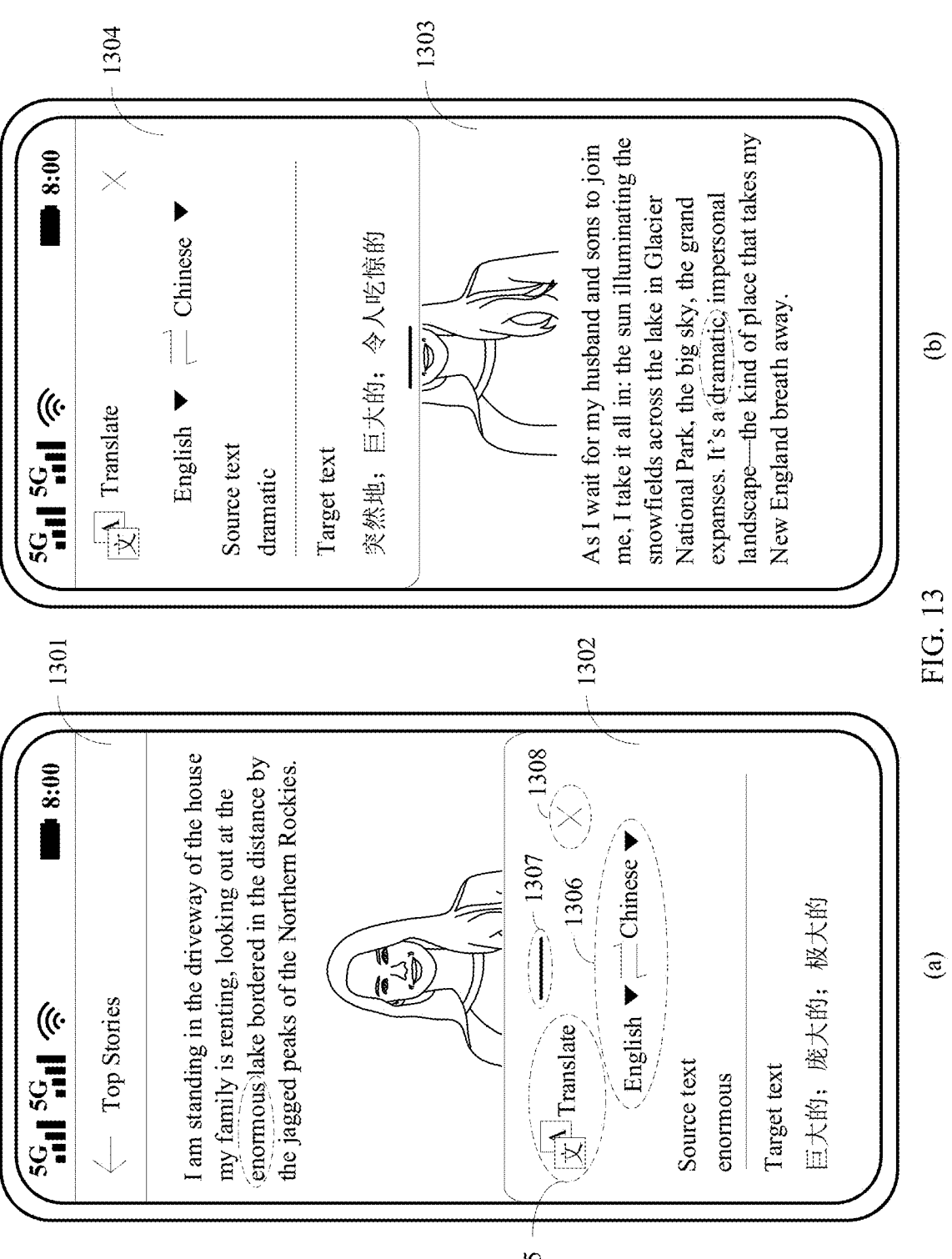
FIG. 13 is a schematic diagram 10 of a mobile phone interface according to an embodiment of this application.

In some other embodiments, the pop-up window a further includes a control b, used to trigger the mobile phone to close the pop-up window a. For example, an "x" button 1308 in the pop-up window a 1302 in the interface a 1301 shown in (a) in FIG. 13 is the control b. In addition, the mobile phone may receive a tap operation or a long press operation performed by the user on the control b. The mobile phone can close the pop-up window a and display the entry a in the interface a in response to the tap or long press operation performed by the user on the control b. In this way, the pop-up window a can be quickly closed after a translation result is obtained. Therefore, efficiency of human-computer interaction is improved.

In the interface 1301 shown in (a) in FIG. 13, the pop-up window a 1302 is close to a bottom of the interface a 1301. Actual implementation is not limited thereto. For example, the pop-up window a used to display the translation result may vary with a position of the source text (for example, the text 1). Generally, the pop-up window should not block the source text. For example, in the interface a 1301 shown in (a) in FIG. 13, the text "enormous" is located at a position near an upper edge of the interface a 1301, and the pop-up window a 1302 is displayed at a position close to the bottom of the interface a 1301. For another example, in an interface a 1303 shown in (b) in FIG. 13, if a text "dramatic" is located at a position near a lower edge of the interface a 1303, a pop-up window a 1304 is displayed at a position near a top of the interface a 1303.

In the following embodiment, that a pop-up window is mainly displayed at a position near the lower edge of the interface a is used as an example for description.

In the foregoing description of S1202a, the mobile phone is triggered, directly by using the entry a after the entry a is displayed, to translate the text 1. In some other embodiments, after the entry a is displayed, the user may alternatively re-copy a text in the interface a (denoted as a text 2) and then trigger translation of the re-copied text by using the entry a. In this way, translation of any text in the interface a can be flexibly triggered by using the entry a. Specifically, as shown in FIG. 14, S1202a may be replaced with S1202b.

S1202b: After the mobile phone detects that the user copies the text 2 in the interface a, the mobile phone responds to the operation 2 performed by the user on the entry a, and displays the pop-up window a in the interface a. The pop-up window a includes a translation result of the text 2.

Before S1202b, the mobile phone may receive the copy operation performed by the user on the text 2 in the interface a. Generally, the text 2 is different from the text 1, but this is not absolute. In some cases, the text 2 may alternatively be the same as the text 1.

Similarly, similar to S1202a, before S1202b, the mobile phone may receive the operation 2 performed by the user on the entry a. For the operation 2, refer to related descriptions in S1202a. Details are not described herein again.

Figure 15:
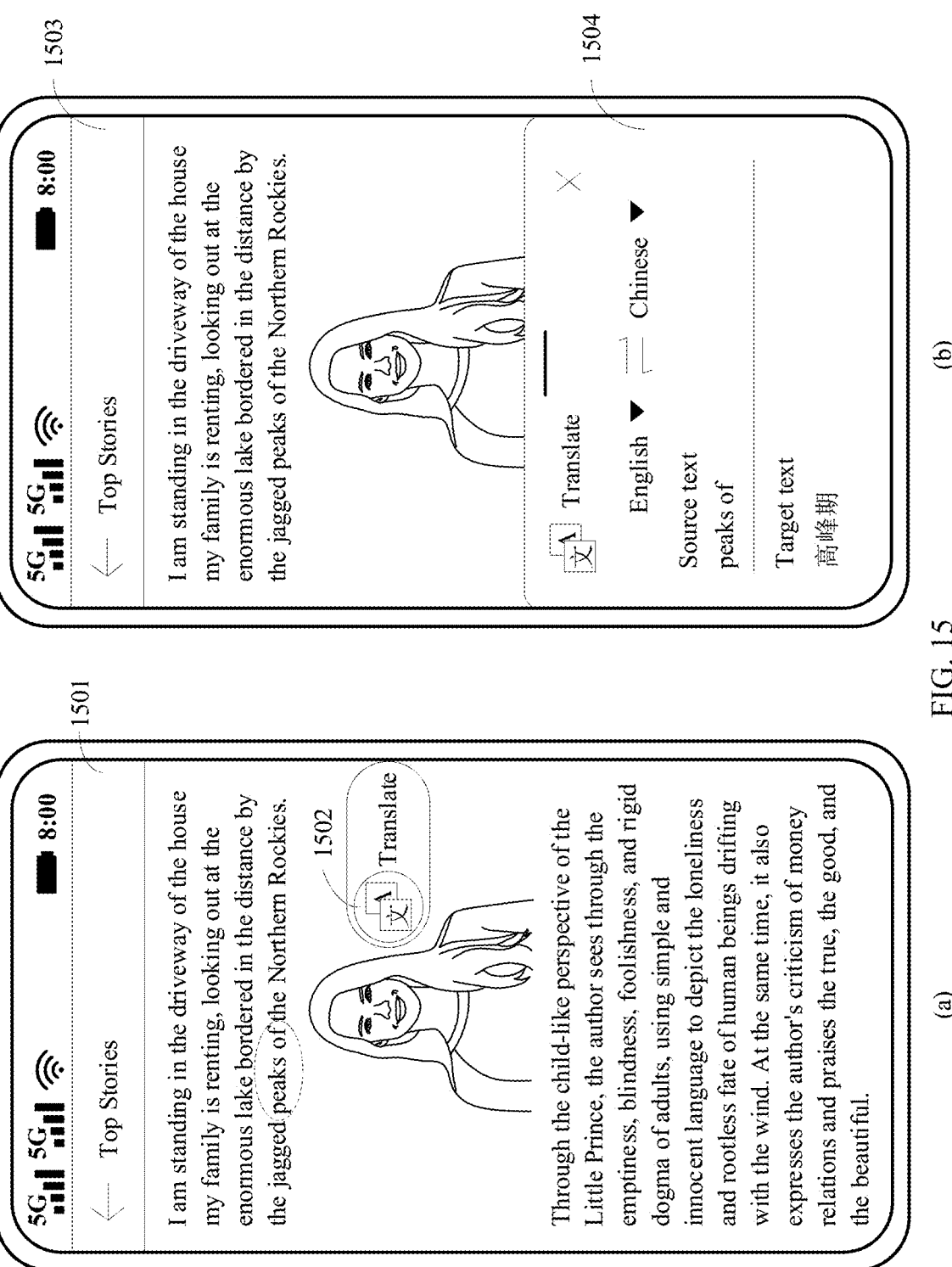
FIG. 15 is a schematic diagram 11 of a mobile phone interface according to an embodiment of this application.

For example, the operation 2 is a tap operation. It is assumed that the text 2 is "peaks of" in an interface a 1501 shown in (a) in FIG. 15, and the entry a is a quick entry 1502 in the interface a 1501 shown in (a) in FIG. 15. After the mobile phone displays the interface a 1501 shown in (a) in FIG. 15, the mobile phone may display an interface a 1503 shown in (b) in FIG. 15 if the mobile phone successively detects a copy operation performed by the user on "peaks of" in the interface a 1501 shown in (a) in FIG. 15 and a tap operation performed on the quick entry 1502. The interface a 1503 includes a pop-up window a 1504. A translation result of "peaks of" is displayed in the pop-up window a 1504.

S1203: The mobile phone retracts the pop-up window a onto an edge of the interface a in response to an operation 3 performed by the user on the interface a.

The operation 3 may be referred to as a third operation.

Before S1203, the mobile phone may receive the operation 3 performed by the user on the interface a. The operation 3 may be a tap operation or a long press operation performed by the user on a region other than the pop-up window a in the interface a. For example, an interface a 1601 shown in FIG. 16A includes a pop-up window a 1602. The operation 3 may be a tap operation on a region other than the pop-up window a 1602 in the interface a 1601, for example, a tap operation at a position 1603. Alternatively, if the pop-up window a is close to the bottom of the interface a, the operation 3 may be a slide operation performed by the user from the upper edge of the pop-up window a to the lower edge of the interface a. If the pop-up window a is close to the top of the interface a, the operation 3 may be a slide operation performed by the user from the lower edge of the pop-up window a to the upper edge of the interface a. For example, the pop-up window a is close to the bottom of the interface a. An interface a 1604 shown in FIG. 16B includes a pop-up window a 1605. The operation 3 may be a slide operation from an upper edge of the pop-up window a 1605 to a lower edge of the interface a 1604. Alternatively, the pop-up window a includes a control a, and the control a is used to trigger the mobile phone to retract the pop-up window a. Correspondingly, the operation 3 may be a tap operation or a long press operation performed by the user on the control a. For example, an interface a 1606 shown in FIG. 16C includes a pop-up window a 1607, and the pop-up window a 1607 includes a control a 1608. The operation 3 may be a tap operation performed by the user on the control a 1608.

In the following embodiment, that the operation 3 is a tap operation performed by the user on a region other than the pop-up window a in the interface a is mainly used as an example to describe the solution in this application.

Figure 16A:
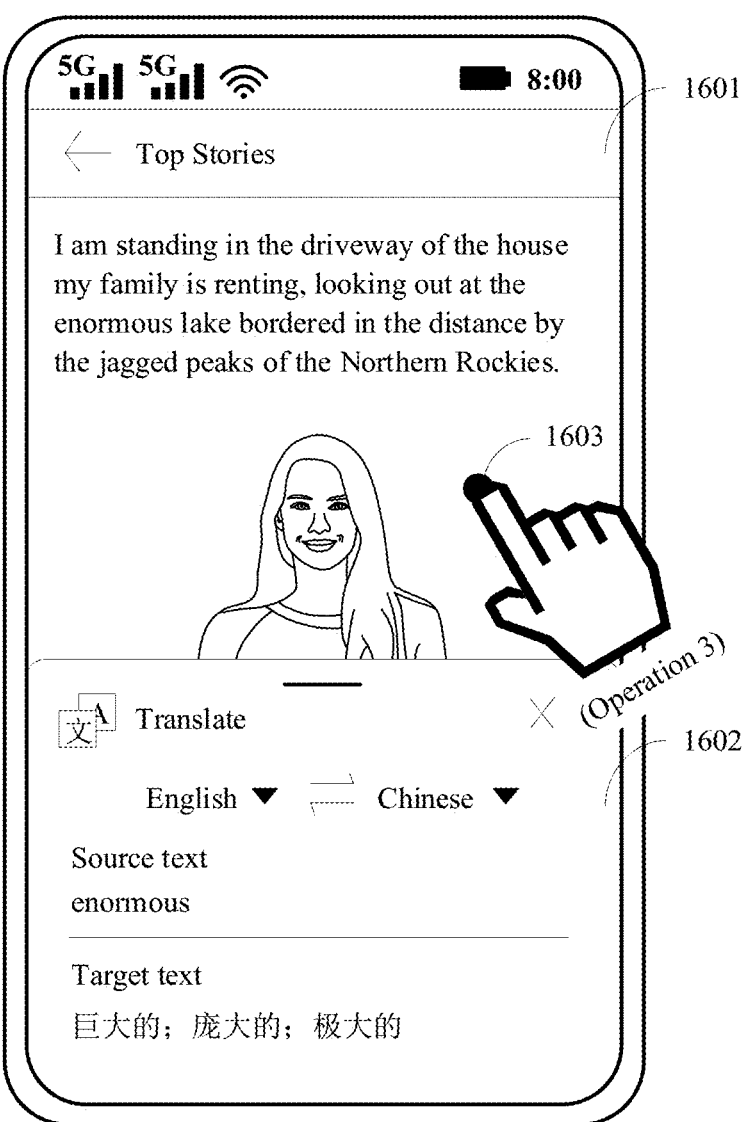
FIG. 16A to FIG. 16C are a schematic diagram 12 of a mobile phone interface according to an embodiment of this application.
Figure 16B:
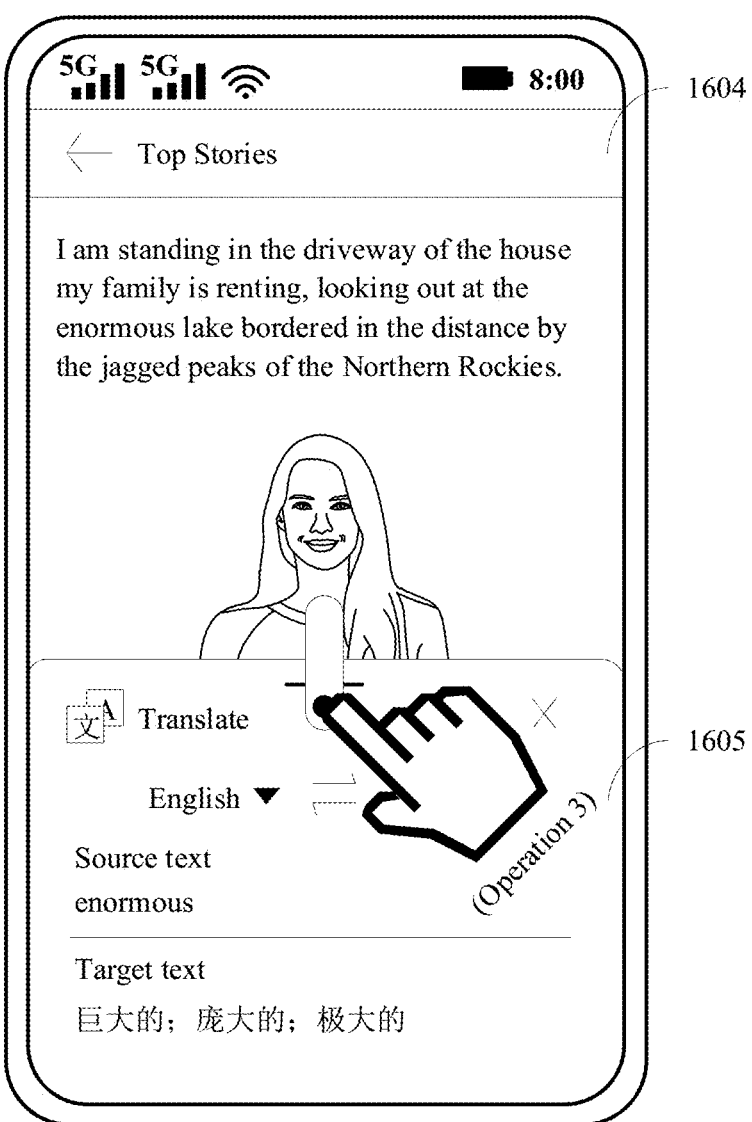
Figure 16C:
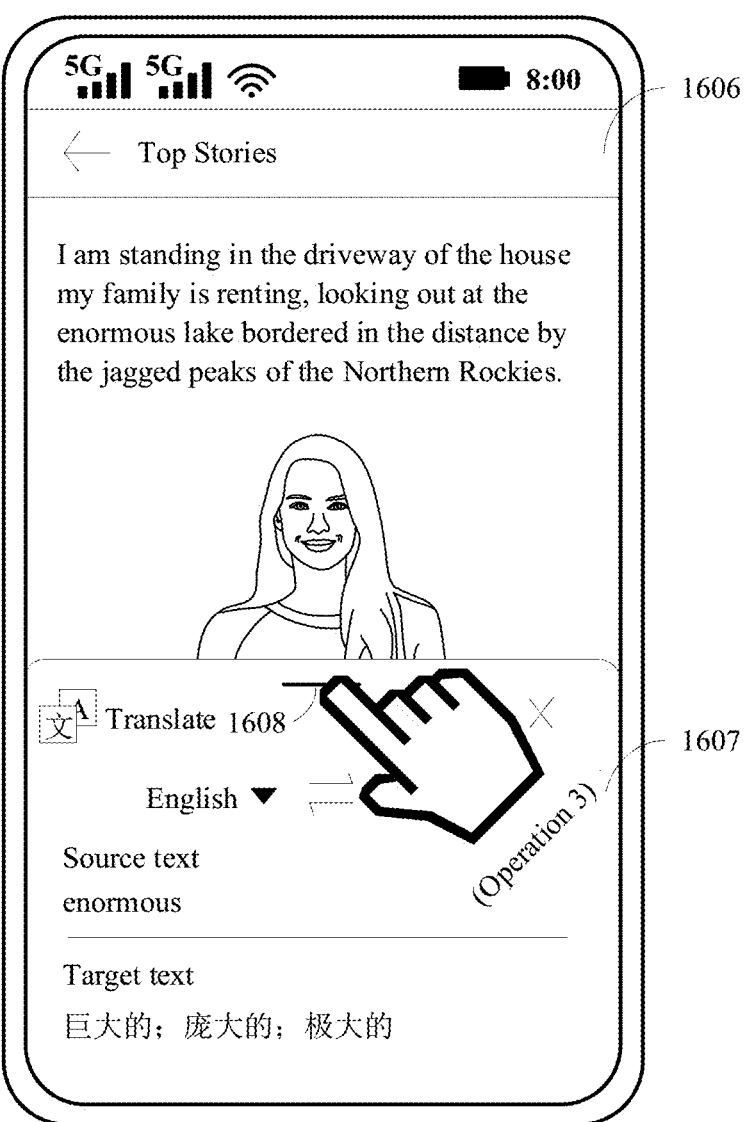
Figure 17:
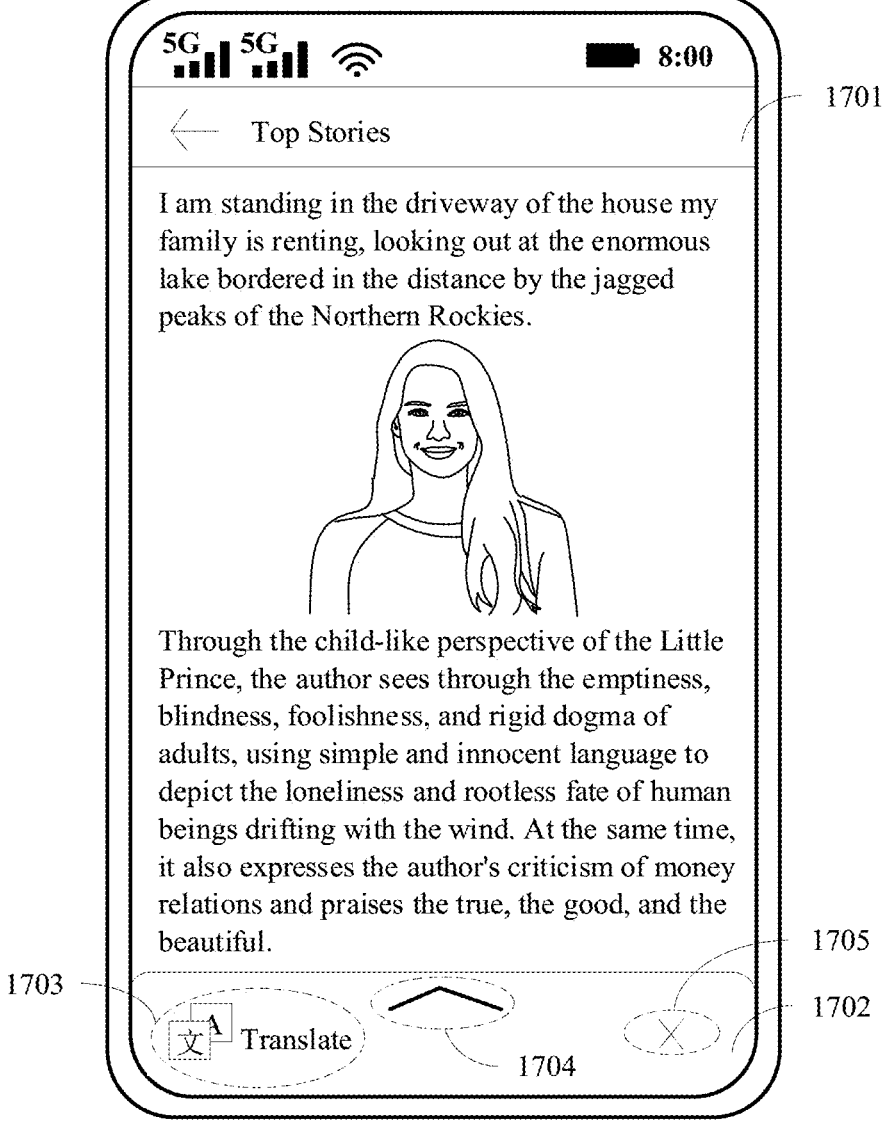
FIG. 17 is a schematic diagram 13 of a mobile phone interface according to an embodiment of this application.

For example, the mobile phone may display an interface a 1701 shown in FIG. 17 in response to a tap operation performed by the user on the position 1603 other than the pop-up window a 1602 in the interface a 1601 shown in FIG. 16A. The interface a 1701 includes a pop-up window a 1702. Unlike the pop-up window a 1602 in FIG. 16A, the pop-up window a 1702 in FIG. 17 is retracted on a lower edge of the interface a 1701, rather than being completely displayed in the interface a 1701.

That is, after the pop-up window a is retracted onto the edge, the pop-up window a cannot be completely presented in the interface a. In this embodiment of this application, the retracted pop-up window a generally does not display a translation result, but may display a translation identifier, the control b, and/or a control c. The control c is used to trigger the mobile phone to expand the pop-up window a. For example, the interface a 1701 shown in FIG. 17 includes a pop-up window a 1702 in a retracted state, and the pop-up window a 1702 does not include a translation result, but displays a translation identifier 1703, an "x" button 1705 (that is, the control b), and a control c 1704.

In a case in which the pop-up window a is in the retracted state, in a scenario, the user may trigger, by performing an operation 4 on the interface a, the mobile phone to expand the pop-up window a, so as to quickly view a translation result of a most frequently copied text (the text 1 or the text 2).

Figure 18:
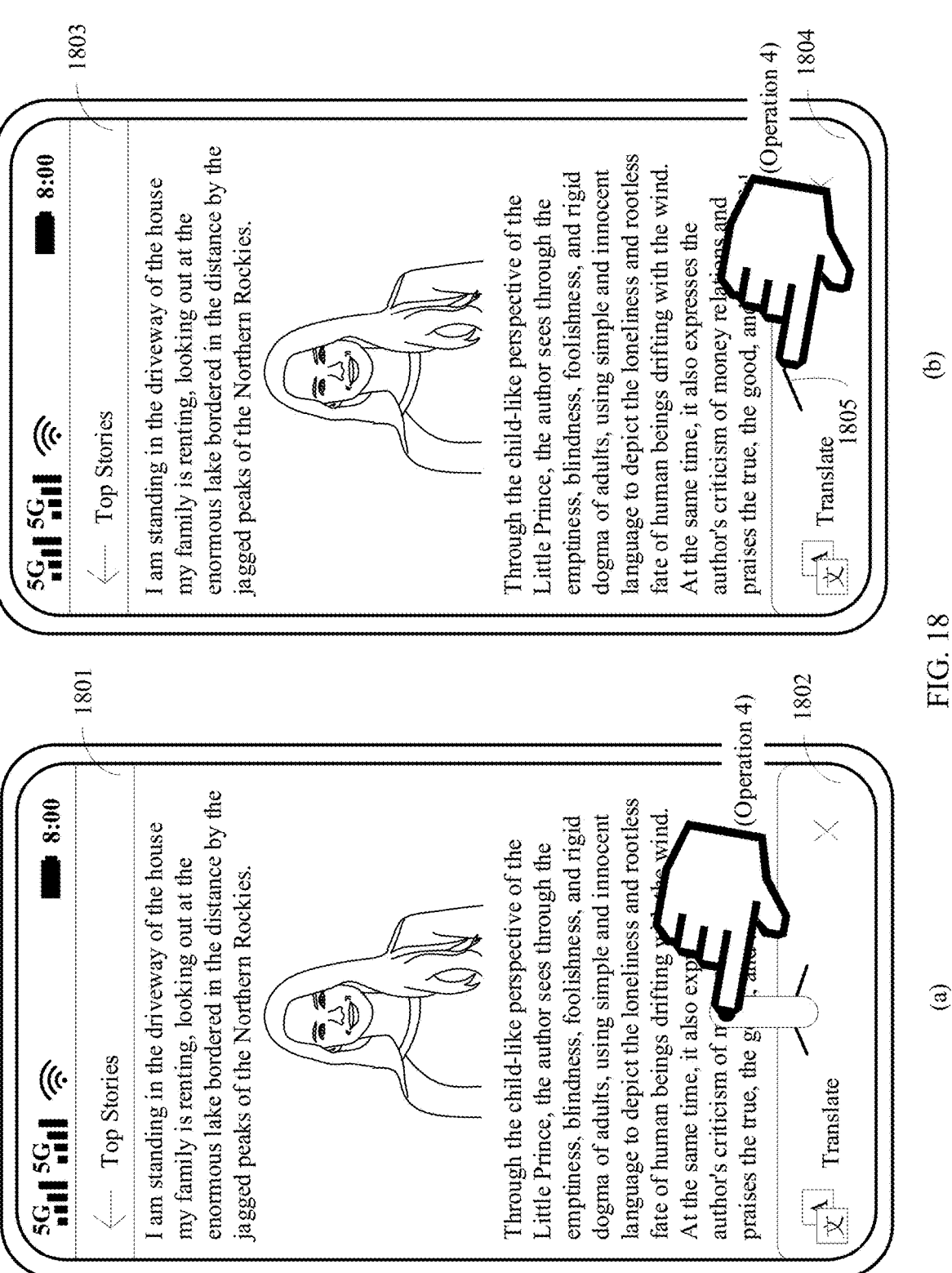
FIG. 18 is a schematic diagram 14 of a mobile phone interface according to an embodiment of this application.

If the pop-up window a is close to the bottom of the interface a, the operation 4 may be a slide operation performed by the user from the lower edge of the pop-up window a to the upper edge of the interface a. If the pop-up window a is close to the top of the interface a, the operation 4 may be a slide operation performed by the user from the upper edge of the pop-up window a to the lower edge of the interface a. For example, the pop-up window a is close to the bottom of the interface a. The operation 4 may be a slide operation performed by the user from a lower edge of a pop-up window a 1802 of an interface a 1801 shown in (a) in FIG. 18 to an upper edge of the interface a 1801. Alternatively, the operation 4 may be a tap operation performed by the user on the control c. For example, the operation 4 may be a tap operation performed by the user on a control c 1805 in a pop-up window a 1804 of an interface a 1803 shown in (b) in FIG. 18.

For example, the most recently copied text is "enormous". The mobile phone may display the interface a 1301 shown in (a) in FIG. 13 in response to the slide operation performed by the user from the lower edge of the pop-up window a 1802 in the interface a 1801 shown in (a) in FIG. 18 to the upper edge of the interface a 1801. The interface a 1301 includes the pop-up window a 1302. The pop-up window a 1302 displays the translation result of "enormous".

Actually, the mobile phone may alternatively hide the pop-up window a in response to the operation 3 performed by the user on the interface a, so as to minimize occupation of the interface a.

In another scenario, the user may trigger the mobile phone to expand the pop-up window a by copying a new text (such as the text 3) to quickly view a translation result of the new text, specifically, as shown in S1204.

S1204: In response to a copy operation performed by the user on the text 3 in the interface a, the mobile phone expands the pop-up window a in the interface a, and displays a translation result of the text 3 in the pop-up window a.

The text 3 may be in any language, for example, may be in a default language set on the mobile phone. The text 3 may be referred to as a second text.

The translation result of the text 3 may be referred to as a second translation result. The translation result of the text 3 includes a translation of the text 3, and the translation of the text 3 may be referred to as a second translation. If the text 3 is not in the default language set on the mobile phone, the translation of the text 3 is a text in the default language set on the mobile phone by default. If the text 3 is in the default language set on the mobile phone, the language of the translation of the text 3 is usually in a translation language selected by the user, or a default translation language of the translation function of the mobile phone (such as English).

Before S1204, the mobile phone may receive the copy operation performed by the user on the text 3 in the interface a. The text 3 may be different from both the text 1 and the text 2, or may be the same as the text 1 or the text 2.

Figure 19A:
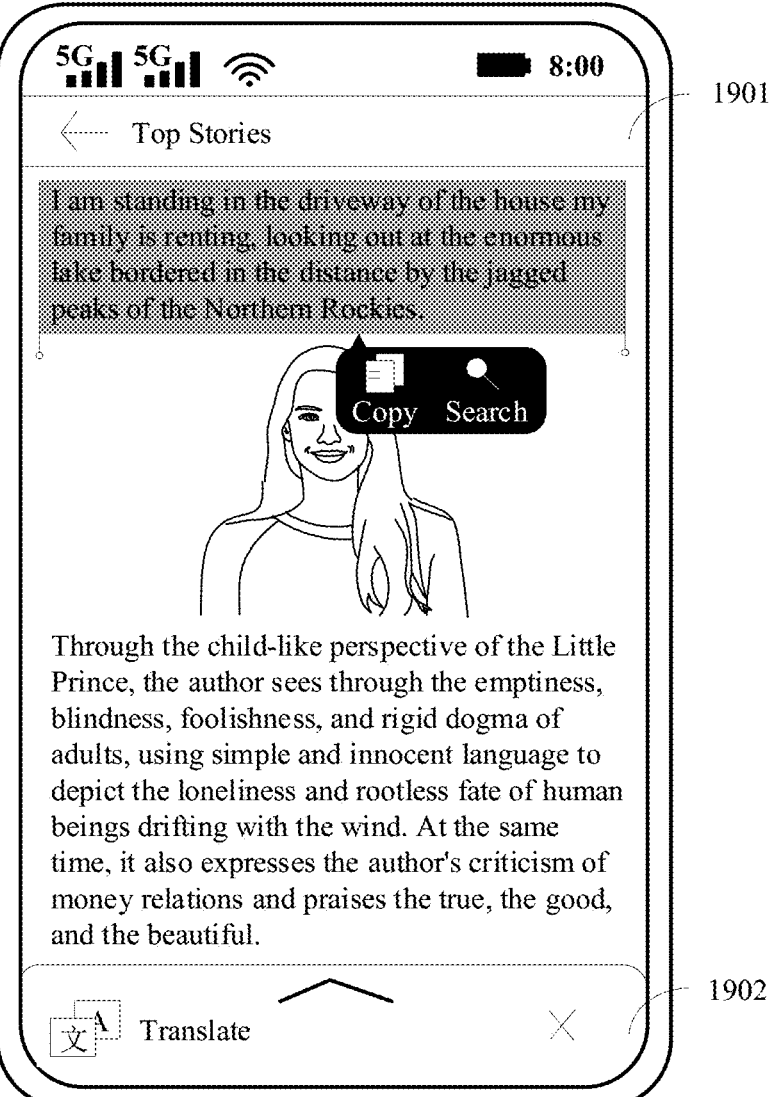
FIG. 19A to FIG. 19C are a schematic diagram 15 of a mobile phone interface according to an embodiment of this application.
Figure 19B:
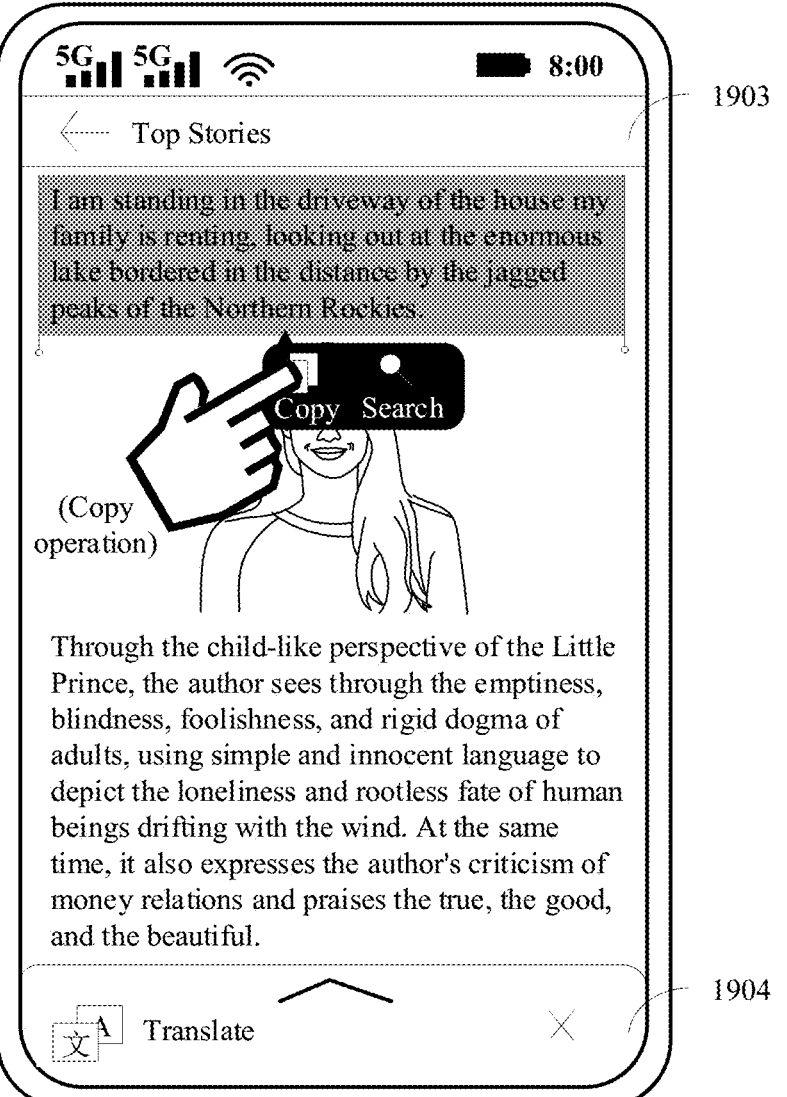
Figure 19C:
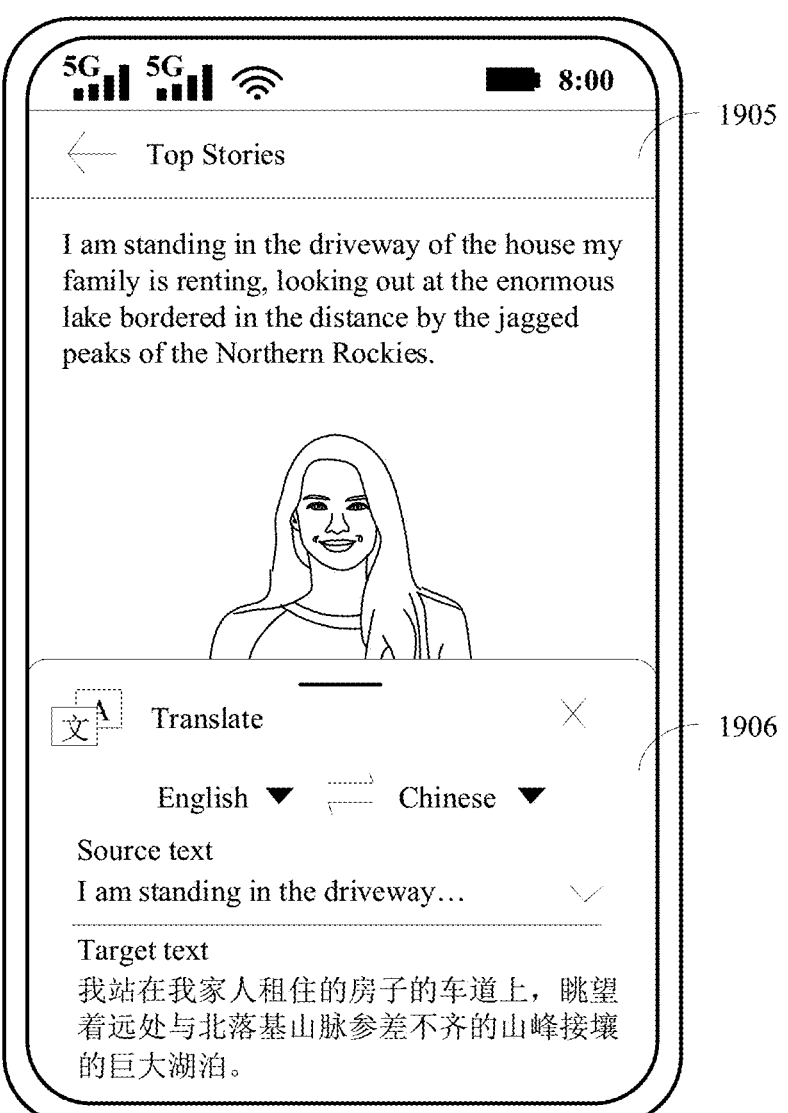

For example, in a case in which the pop-up window a is in the retracted state, the mobile phone may receive a select operation performed by the user on the text 3 in the interface a. The electronic device may display a shortcut menu in the interface a in response to the select operation. For example, the electronic device may display a shortcut menu in an interface a 1901 shown in FIG. 19A in response to a select operation performed by the user on a text 3 "I am standing in the . . . the Northern Rockies" in the interface a 1901, where the shortcut menu includes two quick entries "copy" and "search". Then, the mobile phone may receive a tap operation performed by the user on the quick entry "copy" in an interface a 1903 shown in FIG. 19B, and the mobile phone may display an interface a 1905 shown in FIG. 19C. Unlike the interface a 1903, a pop-up window a 1904 in the interface a 1905 is in an expanded state, and a translation result of "I am standing in the . . . the Northern Rockies" is displayed in a pop-up window a 1906. The pop-up window a 1904 in the interface a 1903 is in the retracted state.

It should be noted that in S1204, a specific implementation of triggering the mobile phone by using a copy operation to perform continuous translation is mainly described. Actual implementation is not limited thereto, and the mobile phone may be triggered by any one of a select operation, a long press operation, an underline operation, or a double tap operation. The foregoing operations of triggering the mobile phone to perform continuous translation may be collectively referred to as a fourth operation.

In the foregoing embodiment, only two times of continuous translation are described. If more than two times of continuous translation are required, the mobile phone may repeatedly perform S1203 and S1204 to complete more than two times of continuous translation. For example, if a third time of translation continuously needs to be completed, the mobile phone may retract the pop-up window a by performing S1203. Then the mobile phone may display a translation result of a new text by performing S1204.

In conclusion, by using the method in this embodiment of this application, after one time of translation is completed, the mobile phone responds to the operation 3 of the user, and may retract the pop-up window used to display the translation result. Then, the mobile phone may directly trigger another time of translation in response to a copy operation performed by the user on a new text, expand the retracted pop-up window, and display a copy result of the new text in the expanded pop-up window. That is, compared with the conventional technology, in a process of a plurality of times of continuous translation in the solution of this application, if the pop-up window is not closed, the user may directly trigger the mobile phone to translate a new text and display a translation result after copying the new text. The user does not need to manually trigger translation again after copying the new text. Therefore, convenience of continuous translation can be improved.

Some other embodiments of this application provide an electronic device. The electronic device may include the foregoing display (such as a touchscreen), a memory, and one or more processors. The display, the memory, and a processor are coupled to each other. The memory is configured to store computer program code, and the computer program code includes computer instructions. When the processor executes the computer instructions, the electronic device can perform the functions or steps performed by the mobile phone in the foregoing method embodiments. For a structure of the electronic device, refer to the structure of the electronic device 500 shown in FIG. 2A to FIG. 2C.

Figure 20:
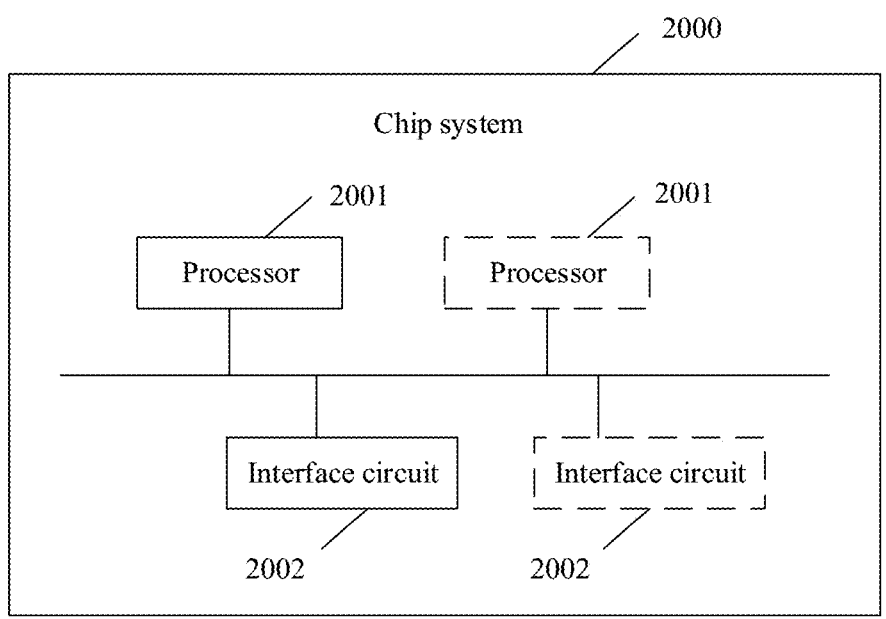
FIG. 20 is a schematic diagram of a structure of a chip system according to an embodiment of this application.

An embodiment of this application further provides a chip system. As shown in FIG. 20, a chip system 2000 includes at least one processor 2001 and at least one interface circuit 2002. The processor 2001 and the interface circuit 2002 may be interconnected by using a line. For example, the interface circuit 2002 may be configured to receive a signal from another apparatus (for example, a memory of an electronic device). In another example, the interface circuit 2002 may be configured to send a signal to another apparatus (for example, the processor 2001). For example, the interface circuit 2002 may read instructions stored in the memory and send the instructions to the processor 2001. When the instructions are executed by the processor 2001, the electronic device may be enabled to perform the steps in the foregoing embodiments. Certainly, the chip system may further include other discrete devices. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

It may be clearly learned by a person skilled in the art from the foregoing descriptions of the implementations that for convenience and brevity of description, only division into the foregoing functional modules is used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A translation method, comprising:

displaying, by an electronic device, a first interface, wherein the first interface comprises a text in a first language;

displaying, by the electronic device, a menu of controls in the first interface in response to a copy operation performed by a user on a first text in the first interface, wherein the first text is a text in the first language, the menu of controls comprises a first control and at least one second control, the first control triggers the electronic device to perform translation, the at least one second control triggers the electronic device to perform an operation other than performing translation, the first control and the at least one second control are comprised in the menu of controls based on a set of predicted intentions of a user of the electronic device in performing the copy operation, and the first control and the at least one second control correspond to predicted intentions having a highest frequency of use of target functions corresponding to the predicted intentions in the set of predicted intentions;

displaying, by the electronic device, a first pop-up window in the first interface in response to a second operation performed by the user on the first control, and displaying a first translation result of the first text in the first pop-up window, wherein the first translation result comprises a first translation of the first text, and the first translation is a text in a second language;

retracting, by the electronic device, the first pop-up window in response to a third operation performed by the user on the first interface; and expanding, by the electronic device, the first pop-up window in response to a fourth operation performed by the user on a second text in the first interface, and displaying a second translation result of the second text in the first pop-up window, wherein the second translation result comprises a second translation of the second text.

2. The method according to claim 1, wherein the second language is a default language set on the electronic device, and the first language is a language other than the second language; and the first interface further comprises a text in the second language; and the method further comprises:

skipping, by the electronic device, displaying the menu of controls another time in response to a copy operation performed by the user on a third text in the first interface, wherein the third text is a text in the second language.

3. The method according to claim 1, wherein the first language is supported for translation by a system of the electronic device or by an application on the electronic device; and the first text is text other than a website link, an email address, or a password generated by using a machine.

4. The method according to claim 1, wherein the second operation is a tap operation or a long press operation; or the third operation comprises a tap operation or a long press operation performed by the user on a region other than the first pop-up window in the first interface, or the third operation comprises a slide operation performed by the user on the first pop-up window.

5. The method according to claim 1, wherein the retracting the first pop-up window comprises:

hiding the first pop-up window, or retracting the first pop-up window onto an edge position of the first interface.

6. The method according to claim 1, wherein the method further comprises:

displaying, by the electronic device, a first identifier in the first interface in response to the copy operation performed by the user on the first text in the first interface, wherein the first identifier indicates that the electronic device is identifying the predicted intentions of the user; and displaying menu of controls in the first interface comprises:

displaying, by the electronic device, the menu of controls in the first interface in response to an identification completion event of the predicted intentions of the user.

7. The method according to claim 1, wherein after the displaying the menu of controls in the first interface, the method further comprises:

when the electronic device does not detect the second operation within a preset time, retracting, by the electronic device, the menu of controls onto an edge position of the first interface.

8. The method according to claim 1, wherein after the displaying a first pop-up window in the first interface, the method further comprises:

closing, by the electronic device, the menu of controls in response to a fifth operation of the user, wherein the fifth operation triggers the electronic device to exit the first interface or to exit a first application to which the first interface belongs.

9. The method according to claim 1, wherein the set of prediction intentions comprises at least one predicted intention that does not correspond to any control in the menu of controls.

10. An electronic device, comprising:

a display;

a memory; and one or more processors, wherein the display, the memory, and the one or more processors are coupled to each other, the memory is configured to store computer program code, the computer program code comprises computer instructions, and when the computer instructions are executed by the processor, the electronic device is enabled to perform operations comprising:

displaying a first interface, wherein the first interface comprises a text in a first language;

displaying a menu of controls in the first interface in response to a copy operation performed by a user on a first text in the first interface, wherein the menu of controls comprises a first control and at least one second control, the first text is a text in the first language, the first control triggers the electronic device to perform translation, the at least one second control triggers the electronic device to perform an operation other than performing translation, the first control and the at least one second control are comprised in the menu of controls based on a set of predicted intentions of a user of the electronic device in performing the copy operation, and the first control and the at least one second control correspond to predicted intentions having a highest frequency of use of target functions corresponding to the predicted intentions in the set of predicted intentions;

displaying a first pop-up window in the first interface in response to a second operation performed by the user on the first control, and displaying a first translation result of the first text in the first pop-up window, wherein the first translation result comprises a first translation of the first text, and the first translation is a text in a second language;

retracting the first pop-up window in response to a third operation performed by the user on the first interface; and expanding the first pop-up window in response to a fourth operation performed by the user on a second text in the first interface, and displaying a second translation result of the second text in the first pop-up window, wherein the second translation result comprises a second translation of the second text.

11. The electronic device according to claim 10, wherein the second language is a default language set on the electronic device, and the first language is a language other than the second language, and the first interface further comprises a text in the second language; and when the computer instructions are executed by the processor, the electronic device is enabled to perform operations further comprising:

skipping displaying the menu of controls another time in response to a copy operation performed by the user on a third text in the first interface, wherein the third text is a text in the second language.

12. The electronic device according to claim 10, wherein:

the first language is supported for translation by a system of the electronic device or by an application on the electronic device; and the first text is other than a website link, an email address, or a password generated by using a machine.

13. The electronic device according to claim 10, wherein the second operation is a tap operation or a long press operation; or the third operation comprises a tap operation or a long press operation performed by the user on a region other than the first pop-up window in the first interface, or the third operation comprises a slide operation performed by the user on the first pop-up window.

14. The electronic device according to claim 10, wherein retracting the first pop-up window comprises:

hiding the first pop-up window, or retracting the first pop-up window onto an edge position of the first interface.

15. The electronic device according to claim 10, wherein the at least one second control triggers the electronic device to add a memo; and/or the at least one second control triggers the electronic device to add a schedule; and/or the at least one second control triggers the electronic device to share with an application; and/or the at least one second control triggers the electronic device to add to favorites; and/or the at least one second control triggers the electronic device to add to a dictionary; and/or the at least one second control triggers the electronic device to open map navigation.

16. The electronic device according to claim 10, wherein the first control comprises the first text or a translation of the first text.

17. The electronic device according to claim 10, wherein when the computer instructions are executed by the processor, the electronic device is enabled to perform operations further comprising:

displaying a first identifier in the first interface in response to the copy operation performed by the user on the first text in the first interface, wherein the first identifier indicates that the electronic device is identifying the predicted intentions of the user; and displaying the menu of controls in the first interface comprises:

displaying the menu of controls in the first interface in response to an identification completion event of the predicted intentions.

18. The electronic device according to claim 10, wherein when the computer instructions are executed by the processor, the electronic device is enabled to perform operations further comprising:

after the displaying the menu of controls in the first interface, when the electronic device does not detect the second operation within a preset time, retracting, the menu of controls onto an edge position of the first interface.

19. The electronic device according to claim 10, wherein when the computer instructions are executed by the processor, the electronic device is enabled to perform operations further comprising:

after displaying the first pop-up window in the first interface, closing, the menu of controls in response to a fifth operation of the user, wherein the fifth operation triggers the electronic device to exit the first interface or to exit a first application to which the first interface belongs.

20. A non-transitory computer-readable storage medium, wherein instructions are stored in the non-transitory computer-readable storage medium, and when the instructions are executed on an electronic device, the electronic device is enabled to perform operations comprising:

displaying a first interface, wherein the first interface comprises a text in a first language;

displaying a menu of controls in the first interface in response to a copy operation performed by a user on a first text in the first interface, wherein the menu of controls comprises a first control and at least one second control, the first text is a text in the first language, the first control triggers the electronic device to perform translation, the at least one second control triggers the electronic device to perform an operation other than performing translation, the first control and the at least one second control are comprised in the menu of controls based on a set of predicted intentions of a user of the electronic device in performing the copy operation, and the first control and the at least one second control correspond to predicted intentions having a highest frequency of use of target functions corresponding to the predicted intentions in the set of predicted intentions;

displaying a first pop-up window in the first interface in response to a second operation performed by the user on the first control, and displaying a first translation result of the first text in the first pop-up window, wherein the first translation result comprises a first translation of the first text, and the first translation is a text in a second language;

retracting, the first pop-up window in response to a third operation performed by the user on the first interface; and expanding, the first pop-up window in response to a fourth operation performed by the user on a second text in the first interface, and displaying a second translation result of the second text in the first pop-up window, wherein the second translation result comprises a second translation of the second text.

* * * * *